US012683725B2

(12) United States Patent
Shah et al.

(10) Patent No.: US 12,683,725 B2
(45) Date of Patent: Jul. 14, 2026

(54) ORTHOGONAL COVER CODE FOR MULTIPLEXING TRANSMISSIONS BY MULTIPLE USER EQUIPMENTS

(71) Applicant: QUALCOMM Incorporated, San Diego, CA (US)

(72) Inventors: Syed Hashim Ali Shah, San Diego, CA (US); Ayan Sengupta, San Diego, CA (US); Alberto Rico Alvarino, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 18/186,772

(22) Filed: Mar. 20, 2023

(65) Prior Publication Data

US 2024/0322955 A1    Sep. 26, 2024

(51) Int. Cl.
| | |
|---|---|
| *H04L 5/00* | (2006.01) |
| *H04L 1/18* | (2023.01) |
| *H04W 72/1268* | (2023.01) |

(52) U.S. Cl.
CPC ............. *H04L 5/0007* (2013.01); *H04L 1/18* (2013.01); *H04L 5/0037* (2013.01); *H04W 72/1268* (2013.01)

(58) Field of Classification Search
CPC ....... H04L 5/0007; H04L 1/18; H04L 5/0037; H04L 1/189; H04L 1/1893; H04L 5/0044; H04L 1/1819; H04W 72/1268
See application file for complete search history.

(56) References Cited

U.S. PATENT DOCUMENTS

| | | | |
|---|---|---|---|
| 2019/0068424 A1* | 2/2019 | Park | ................... H04L 27/2602 |
| 2020/0022117 A1* | 1/2020 | Dong | ....................... H04L 1/08 |
| 2021/0274568 A1 | 9/2021 | Sengupta et al. | |

(Continued)

OTHER PUBLICATIONS

CMCC: "Discussion on the NR-NTN Uplink Capacity/throughput Enhancements", 3GPP TSG RAN WG1 #116, 3GPP Draft, R1-2400346, Type Discussion, NR_NTN_PH3-CORE, 3rd Generation Partnership Project (3GPP), Mobile Competence Centre, 650, Route Des Lucioles, F-06921 Sophia-antipolis Cedex, France, vol. 3GPP RAN 1, No. Athens, GR, Feb. 26, 2024-Mar. 1, 2024, Feb. 19, 2024, 8 Pages, XP052568128, p. 3-p. 5.

(Continued)

*Primary Examiner* — Sharmin Chowdhury
(74) *Attorney, Agent, or Firm* — Holland & Hart LLP

(57) ABSTRACT

Methods, systems, and devices for wireless communications are described. The techniques described herein relate multiplexing transmissions from multiple user equipments (UEs) on the same time-frequency resources. A UE may receive control signaling from a network entity indicating a multiplexing order, a repetition configuration, and a orthogonal cover coding (OCC) configuration to apply to an uplink grant. The repetition configuration may indicate a set of redundancy versions (RVs), a quantity of resource elements (REs) for each RV, and a quantity of repetitions for each RV. The UE may generate a transport block (TB) using the OCC configuration, and the instances of the RVs of the TB may be mapped to REs of the TB based on the multiplexing order and OCC configuration.

23 Claims, 19 Drawing Sheets

(56) References Cited

U.S. PATENT DOCUMENTS

| | | | | |
|---|---|---|---|---|
| 2021/0368534 | A1* | 11/2021 | Sato | H04W 72/569 |
| 2025/0212219 | A1* | 6/2025 | Yamamoto | H04L 5/0048 |

OTHER PUBLICATIONS

Huawei, et al., "Discussion on UL Capacity Enhancements for IoT NTN", 3GPP TSG-RAN WG1 Meeting #116, 3GPP Draft, R1-2400135, Type Discussion, IOT_NTN_PH3-CORE, 3rd Generation Partnership Project (3GPP), Mobile Competence Centre, 650, Route Des Lucioles, F-06921 Sophia-antipolis Cedex, France, vol. 3GPP RAN 1, No. Athens, GR, Feb. 26, 2024-Mar. 1, 2024, Feb. 19, 2024, 11 Pages, XP052567921, p. 3-p. 4.
International Search Report and Written Opinion—PCT/US2024/019733—ISA/EPO—Jun. 18, 2024.
Qualcomm Incorporated: "NR and IoT NTN", 3GPP RAN Rel-19 Workshop, RWS-230178, 3rd Generation Partnership Project (3GPP), Mobile Competence Centre, 650, Route Des Lucioles, F-06921 Sophia-antipolis Cedex, France, No. Taipei, Taiwan, Jun. 15, 2023-Jun. 16, 2023, May 31, 2023, pp. 1-14, XP052496910, p. 4.

* cited by examiner

130

105

115

Network Entity

Transceiver

1710

Antenna

1715

Communications Manager

1720

Memory

Code

1730

1725

1740

Processor

1735

1705

1700

Figure 18:
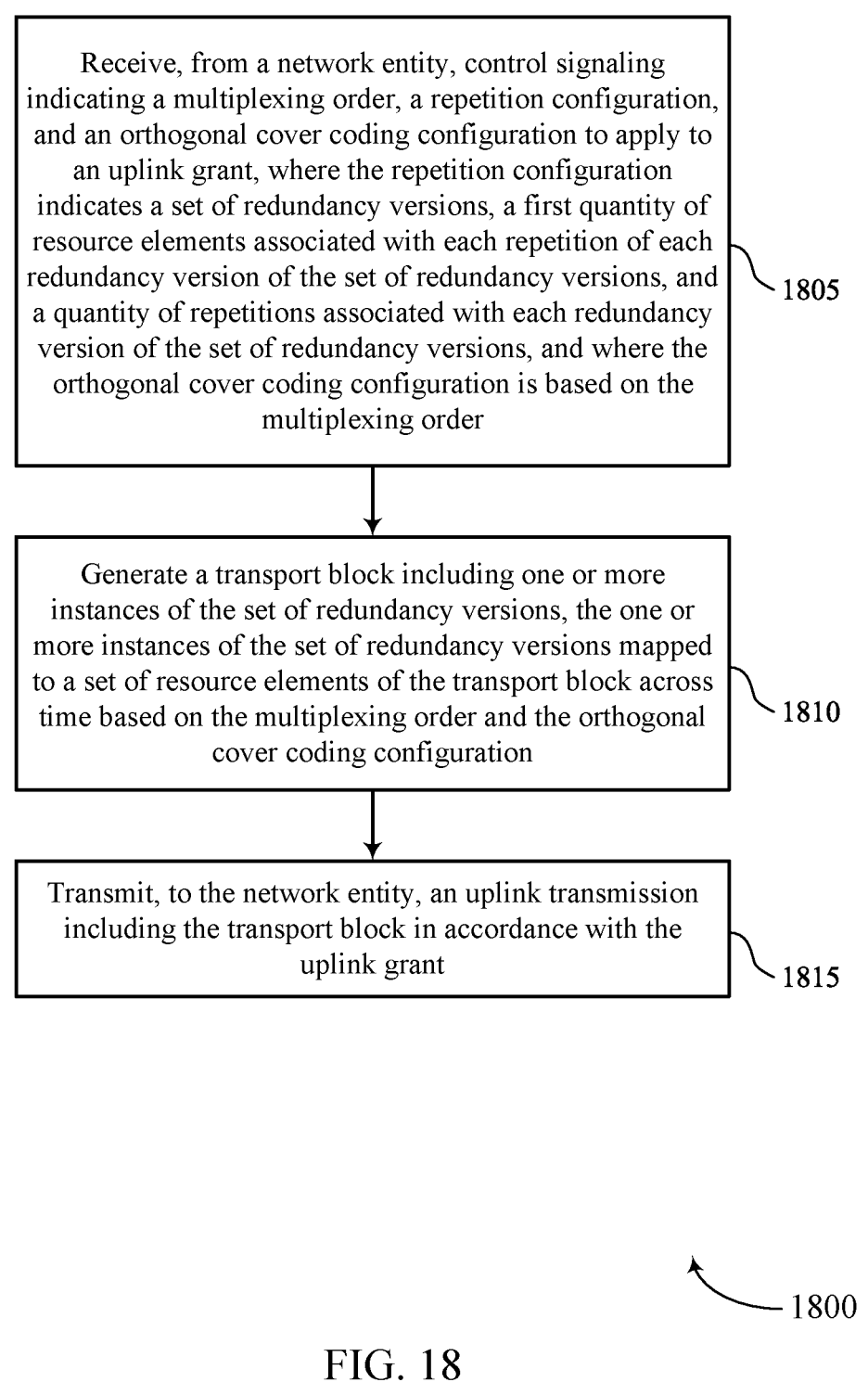

Receive, from a network entity, control signaling indicating a multiplexing order, a repetition configuration, and an orthogonal cover coding configuration to apply to an uplink grant, where the repetition configuration indicates a set of redundancy versions, a first quantity of resource elements associated with each repetition of each redundancy version of the set of redundancy versions, and a quantity of repetitions associated with each redundancy version of the set of redundancy versions, and where the orthogonal cover coding configuration is based on the multiplexing order

1805

Generate a transport block including one or more instances of the set of redundancy versions, the one or more instances of the set of redundancy versions mapped to a set of resource elements of the transport block across time based on the multiplexing order and the orthogonal cover coding configuration

1810

Transmit, to the network entity, an uplink transmission including the transport block in accordance with the uplink grant

Figure 19:
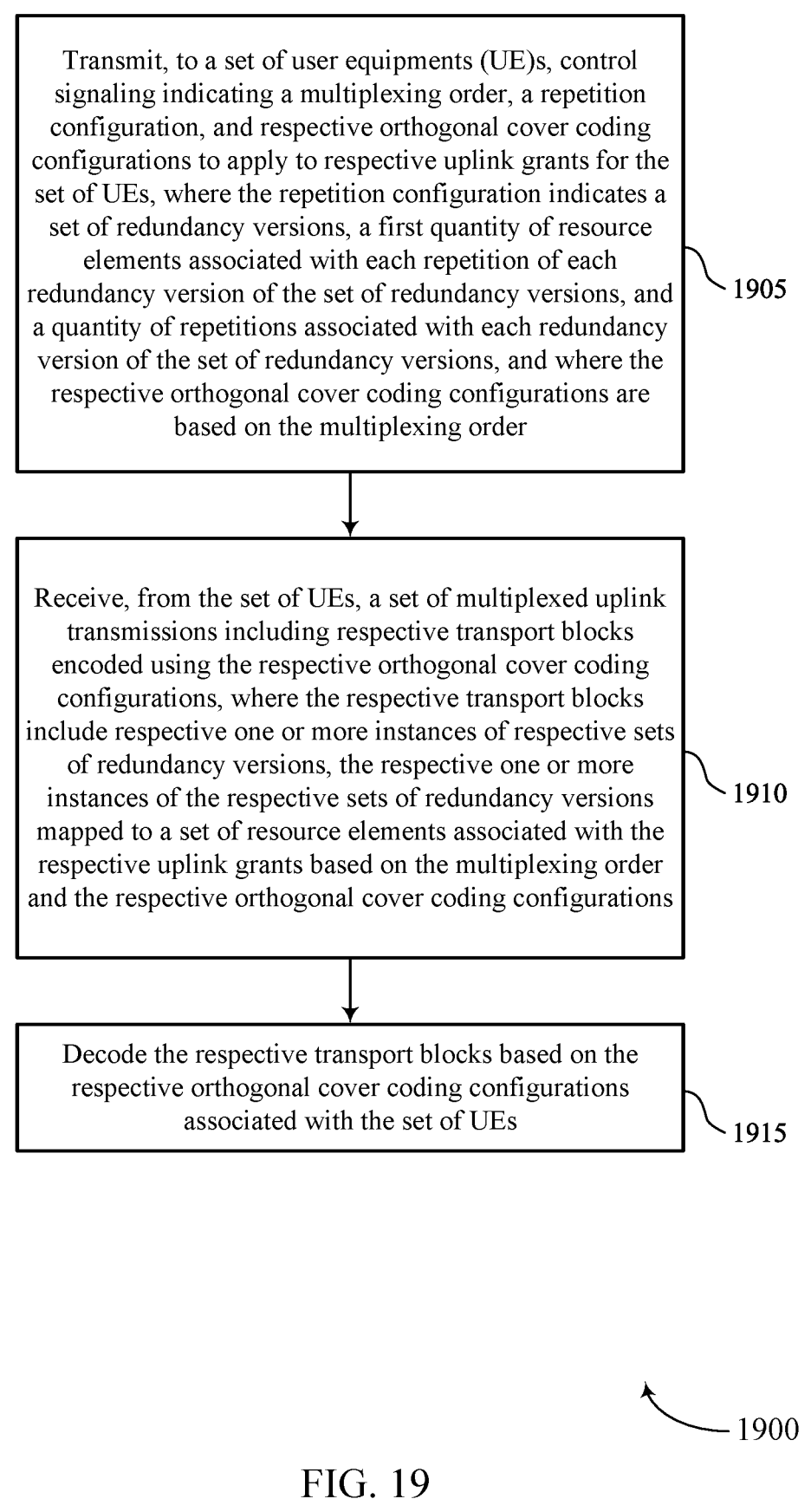

Transmit, to a set of user equipments (UE)s, control signaling indicating a multiplexing order, a repetition configuration, and respective orthogonal cover coding configurations to apply to respective uplink grants for the set of UEs, where the repetition configuration indicates a set of redundancy versions, a first quantity of resource elements associated with each repetition of each redundancy version of the set of redundancy versions, and a quantity of repetitions associated with each redundancy version of the set of redundancy versions, and where the respective orthogonal cover coding configurations are based on the multiplexing order

1905

Receive, from the set of UEs, a set of multiplexed uplink transmissions including respective transport blocks encoded using the respective orthogonal cover coding configurations, where the respective transport blocks include respective one or more instances of respective sets of redundancy versions, the respective one or more instances of the respective sets of redundancy versions mapped to a set of resource elements associated with the respective uplink grants based on the multiplexing order and the respective orthogonal cover coding configurations

1910

Decode the respective transport blocks based on the respective orthogonal cover coding configurations associated with the set of UEs

ORTHOGONAL COVER CODE FOR MULTIPLEXING TRANSMISSIONS BY MULTIPLE USER EQUIPMENTS

FIELD OF TECHNOLOGY

The following relates to wireless communications, including orthogonal cover code for multiplexing transmissions by multiple user equipments.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support orthogonal cover code (OCC) for multiplexing transmissions by multiple user equipments (UEs). Two or more UEs may simultaneously transmit uplink transmissions scheduled with repetitions to a network entity using the same time-frequency resources using an orthogonal cover coding configuration. For example, transmitting UEs may use an orthogonal code to enable orthogonal M order UE multiplexing without complex scrambling and/or complex receiver designs at the network entity, where M refers to the multiplexing order (e.g., the number of UEs transmitting over the same time-frequency resources). For example, the network entity may indicate to a UE the multiplexing order M, a repetition configuration, and an orthogonal cover coding configuration to apply to an uplink grant. The repetition configuration may indicate a set of redundancy versions (RVs) (e.g., a quantity of RVs associated with the uplink transmission for each of the UEs), a quantity of resource elements (REs) associated with each repetition of each RV of the set of RVs, and a quantity of repetitions associated with each RV of the set of RVs (e.g., quantity of times each of the RVs is repeated). Each UE performs a mapping of the repetitions of the RVs across time in accordance with the orthogonal cover code and the multiplexing order M, for example, by using indicated rows or columns of a Hadamard matrix or a discrete Fourier transform (DFT) matrix sized based on the size of M, and accordingly transmissions by the M UEs are orthogonal. If the total number or repetitions is more than 2 M, the UEs may apply the OCC-based mapping of the repetitions of the RVs across time without increasing the amount of time-frequency resources used for the uplink transmissions. Accordingly, uplink capacity is increased from the network perspective.

A method for wireless communications at a user equipment UE is described. The method may include receiving, from a network entity, control signaling indicating a multiplexing order, a repetition configuration, and an orthogonal cover coding configuration to apply to an uplink grant, where the repetition configuration indicates a set of redundancy versions, a first quantity of REs associated with each repetition of each redundancy version of the set of redundancy versions, and a quantity of repetitions associated with each redundancy version of the set of redundancy versions, and where the orthogonal cover coding configuration is based on the multiplexing order, generating a transport block including one or more instances of the set of redundancy versions, the one or more instances of the set of redundancy versions mapped to a set of REs of the transport block across time based on the multiplexing order and the orthogonal cover coding configuration, and transmitting, to the network entity, an uplink transmission including the transport block in accordance with the uplink grant.

An apparatus for wireless communications at a UE is described. The apparatus may include a processor, memory coupled with the processor, and instructions stored in the memory. The instructions may be executable by the processor to cause the apparatus to receive, from a network entity, control signaling indicating a multiplexing order, a repetition configuration, and an orthogonal cover coding configuration to apply to an uplink grant, where the repetition configuration indicates a set of RVs, a first quantity of REs associated with each repetition of each RV of the set of RVs, and a quantity of repetitions associated with each RV of the set of RVs, and where the orthogonal cover coding configuration is based on the multiplexing order, generate a transport block including one or more instances of the set of RVs, the one or more instances of the set of RVs mapped to a set of REs of the transport block across time based on the multiplexing order and the orthogonal cover coding configuration, and transmit, to the network entity, an uplink transmission including the transport block in accordance with the uplink grant.

Another apparatus for wireless communications at a UE is described. The apparatus may include means for receiving, from a network entity, control signaling indicating a multiplexing order, a repetition configuration, and an orthogonal cover coding configuration to apply to an uplink grant, where the repetition configuration indicates a set of RVs, a first quantity of REs associated with each repetition of each RV of the set of RVs, and a quantity of repetitions associated with each RV of the set of RVs, and where the orthogonal cover coding configuration is based on the multiplexing order, means for generating a transport block including one or more instances of the set of RVs, the one or more instances of the set of RVs mapped to a set of REs of the transport block across time based on the multiplexing order and the orthogonal cover coding configuration, and means for transmitting, to the network entity, an uplink transmission including the transport block in accordance with the uplink grant.

A non-transitory computer-readable medium storing code for wireless communications at a UE is described. The code may include instructions executable by a processor to receive, from a network entity, control signaling indicating a multiplexing order, a repetition configuration, and an orthogonal cover coding configuration to apply to an uplink grant, where the repetition configuration indicates a set of RVs, a first quantity of REs associated with each repetition of each RV of the set of RVs, and a quantity of repetitions associated with each RV of the set of RVs, and where the orthogonal cover coding configuration is based on the multiplexing order, generate a transport block including one or more instances of the set of RVs, the one or more instances of the set of RVs mapped to a set of REs of the transport block across time based on the multiplexing order and the orthogonal cover coding configuration, and transmit, to the network entity, an uplink transmission including the transport block in accordance with the uplink grant.

Some examples of the method, apparatuses, and non-transitory computer-readable medium described herein may further include operations, features, means, or instructions for receiving, from the network entity, an indication that the set of REs may be associated with the uplink grant and mapping each instance of each RV of the set of RVs to subsets of REs of the set of REs, a second quantity of REs of each subset being the first quantity multiplied by the multiplexing order.

Some examples of the method, apparatuses, and non-transitory computer-readable medium described herein may further include operations, features, means, or instructions for receiving, from the network entity, a second uplink grant associated with a second set of REs, where the second set of REs includes a same quantity of REs as the set of REs, and where a second multiplexing order associated with the second uplink grant may be one, generating a second transport block in accordance with the repetition configuration, and transmitting, to the network entity, a second uplink transmission including the second transport block in accordance with the second uplink grant, where a first data capacity of the transport block may be equal to a second data capacity of the second transport block.

In some examples of the method, apparatuses, and non-transitory computer-readable medium described herein, generating the transport block may include operations, features, means, or instructions for generating the set of RVs from a data buffer, mapping sets of repetitions of the set of RVs to respective consecutive subsets of REs of the set of REs across time, where a quantity of repetitions of each of the sets of repetitions may be based on the multiplexing order, and applying the orthogonal cover coding configuration to the sets of repetitions of the set of RVs mapped to the respective consecutive subsets of REs across time to generate the transport block.

In some examples of the method, apparatuses, and non-transitory computer-readable medium described herein, applying the orthogonal cover coding configuration may include operations, features, means, or instructions for applying the orthogonal cover coding configuration on a per symbol basis, a per slot basis, a per resource unit basis, or a per RV basis.

In some examples of the method, apparatuses, and non-transitory computer-readable medium described herein, receiving the control signaling may include operations, features, means, or instructions for receiving the control signaling indicating the orthogonal cover coding configuration includes rows or columns associated with a Hadamard matrix or a discrete Fourier transform matrix, and where the control signaling indicates which rows or columns of the Hadamard matrix or the discrete Fourier transform matrix may be associated with the UE.

In some examples of the method, apparatuses, and non-transitory computer-readable medium described herein, a size of the Hadamard matrix or the discrete Fourier transform matrix may be associated with the multiplexing order.

In some examples of the method, apparatuses, and non-transitory computer-readable medium described herein, receiving the control signaling may include operations, features, means, or instructions for receiving a first control message indicating the repetition configuration and receiving a second control message indicating the uplink grant, the multiplexing order, and the orthogonal cover coding configuration.

In some examples of the method, apparatuses, and non-transitory computer-readable medium described herein, a total quantity of repetitions may be at least twice the multiplexing order, and the total quantity of repetitions may be the quantity of repetitions associated with each RV multiplied by a quantity of RVs in the set of RVs.

In some examples of the method, apparatuses, and non-transitory computer-readable medium described herein, the network entity may be a non-terrestrial network entity.

In some examples of the method, apparatuses, and non-transitory computer-readable medium described herein, receiving the control signaling may include operations, features, means, or instructions for receiving the control signaling via radio resource control signaling, a medium access control (MAC) control element, or a combination thereof.

A method for wireless communications at a network entity is described. The method may include transmitting, to a set of user equipments UEs, control signaling indicating a multiplexing order, a repetition configuration, and respective orthogonal cover coding configurations to apply to respective uplink grants for the set of UEs, where the repetition configuration indicates a set of RVs, a first quantity of REs associated with each repetition of each RV of the set of RVs, and a quantity of repetitions associated with each RV of the set of RVs, and where the respective orthogonal cover coding configurations are based on the multiplexing order, receiving, from the set of UEs, a set of multiplexed uplink transmissions including respective transport blocks encoded using the respective orthogonal cover coding configurations, where the respective transport blocks include respective one or more instances of respective sets of RVs, the respective one or more instances of the respective sets of RVs mapped to a set of REs associated with the respective uplink grants based on the multiplexing order and the respective orthogonal cover coding configurations, and decoding the respective transport blocks based on the respective orthogonal cover coding configurations associated with the set of UEs.

An apparatus for wireless communications at a network entity is described. The apparatus may include a processor, memory coupled with the processor, and instructions stored in the memory. The instructions may be executable by the processor to cause the apparatus to transmit, to a set of user equipments UEs, control signaling indicating a multiplexing order, a repetition configuration, and respective orthogonal cover coding configurations to apply to respective uplink grants for the set of UEs, where the repetition configuration indicates a set of RVs, a first quantity of REs associated with each repetition of each RV of the set of RVs, and a quantity of repetitions associated with each RV of the set of RVs, and where the respective orthogonal cover coding configurations are based on the multiplexing order, receive, from the set of UEs, a set of multiplexed uplink transmissions including respective transport blocks encoded using the respective orthogonal cover coding configurations, where the respective transport blocks include respective one or more instances of respective sets of RVs, the respective one or more instances of the respective sets of RVs mapped to a set of REs associated with the respective uplink grants based on the multiplexing order and the respective orthogonal cover coding configurations, and decode the respective transport blocks based on the respective orthogonal cover coding configurations associated with the set of UEs.

Another apparatus for wireless communications at a network entity is described. The apparatus may include means for transmitting, to a set of user equipments UEs, control signaling indicating a multiplexing order, a repetition configuration, and respective orthogonal cover coding configurations to apply to respective uplink grants for the set of UEs, where the repetition configuration indicates a set of RVs, a first quantity of REs associated with each repetition of each RV of the set of RVs, and a quantity of repetitions associated with each RV of the set of RVs, and where the respective orthogonal cover coding configurations are based on the multiplexing order, means for receiving, from the set of UEs, a set of multiplexed uplink transmissions including respective transport blocks encoded using the respective orthogonal cover coding configurations, where the respective transport blocks include respective one or more instances of respective sets of RVs, the respective one or more instances of the respective sets of RVs mapped to a set of REs associated with the respective uplink grants based on the multiplexing order and the respective orthogonal cover coding configurations, and means for decoding the respective transport blocks based on the respective orthogonal cover coding configurations associated with the set of UEs.

A non-transitory computer-readable medium storing code for wireless communications at a network entity is described. The code may include instructions executable by a processor to transmit, to a set of user equipments UEs, control signaling indicating a multiplexing order, a repetition configuration, and respective orthogonal cover coding configurations to apply to respective uplink grants for the set of UEs, where the repetition configuration indicates a set of RVs, a first quantity of REs associated with each repetition of each RV of the set of RVs, and a quantity of repetitions associated with each RV of the set of RVs, and where the respective orthogonal cover coding configurations are based on the multiplexing order, receive, from the set of UEs, a set of multiplexed uplink transmissions including respective transport blocks encoded using the respective orthogonal cover coding configurations, where the respective transport blocks include respective one or more instances of respective sets of RVs, the respective one or more instances of the respective sets of RVs mapped to a set of REs associated with the respective uplink grants based on the multiplexing order and the respective orthogonal cover coding configurations, and decode the respective transport blocks based on the respective orthogonal cover coding configurations associated with the set of UEs.

Some examples of the method, apparatuses, and non-transitory computer-readable medium described herein may further include operations, features, means, or instructions for transmitting, to the set of UEs, an indication of the set of REs associated with the respective uplink grants, where the set of multiplexed uplink transmissions may be received via the set of REs.

Some examples of the method, apparatuses, and non-transitory computer-readable medium described herein may further include operations, features, means, or instructions for transmitting, to a UE of the set of UEs, a second uplink grant associated with a second set of REs, where the second set of REs includes a same quantity of REs as the set of REs, and where a second multiplexing order associated with the second uplink grant may be one and receiving, from the UE, a second uplink transmission including a second transport block in accordance with the second uplink grant, where a first data capacity of the respective transport block associated with the UE may be equal to a second data capacity of the second transport block.

In some examples of the method, apparatuses, and non-transitory computer-readable medium described herein, decoding the respective transport blocks based on the respective orthogonal cover coding configurations associated with the set of UEs may include operations, features, means, or instructions for decoding the respective transport blocks based on the respective orthogonal cover coding configurations on a per symbol basis, a per slot basis, a per resource unit basis, or a per RV basis.

In some examples of the method, apparatuses, and non-transitory computer-readable medium described herein, transmitting the control signaling may include operations, features, means, or instructions for transmitting the control signaling indicating the respective orthogonal cover coding configurations include rows or columns associated with a Hadamard matrix or a discrete Fourier transform matrix, and where the control signaling indicates which rows or columns of the Hadamard matrix or the discrete Fourier transform matrix may be associated with each of the set of UEs.

In some examples of the method, apparatuses, and non-transitory computer-readable medium described herein, a size of the Hadamard matrix or the discrete Fourier transform matrix may be associated with the multiplexing order.

In some examples of the method, apparatuses, and non-transitory computer-readable medium described herein, transmitting the control signaling may include operations, features, means, or instructions for transmitting a first control message indicating the repetition configuration and transmitting respective second control messages to the set of UEs indicating the respective uplink grants, the multiplexing order, and the respective orthogonal cover coding configurations.

In some examples of the method, apparatuses, and non-transitory computer-readable medium described herein, a total quantity of repetitions may be at least twice the multiplexing order, and the total quantity of repetitions may be the quantity of repetitions associated with each RV multiplied by a quantity of RVs in the set of RVs.

In some examples of the method, apparatuses, and non-transitory computer-readable medium described herein, the network entity may be a non-terrestrial network entity.

In some examples of the method, apparatuses, and non-transitory computer-readable medium described herein, transmitting the control signaling may include operations, features, means, or instructions for transmitting the control signaling via radio resource control signaling, a MAC control element, or a combination thereof.

BRIEF DESCRIPTION OF THE DRAWINGS

FIGS. 18 and 19 illustrate flowcharts showing methods that support OCC for multiplexing transmissions by multiple UEs in accordance with one or more aspects of the present disclosure.

DETAILED DESCRIPTION

Figure 1:
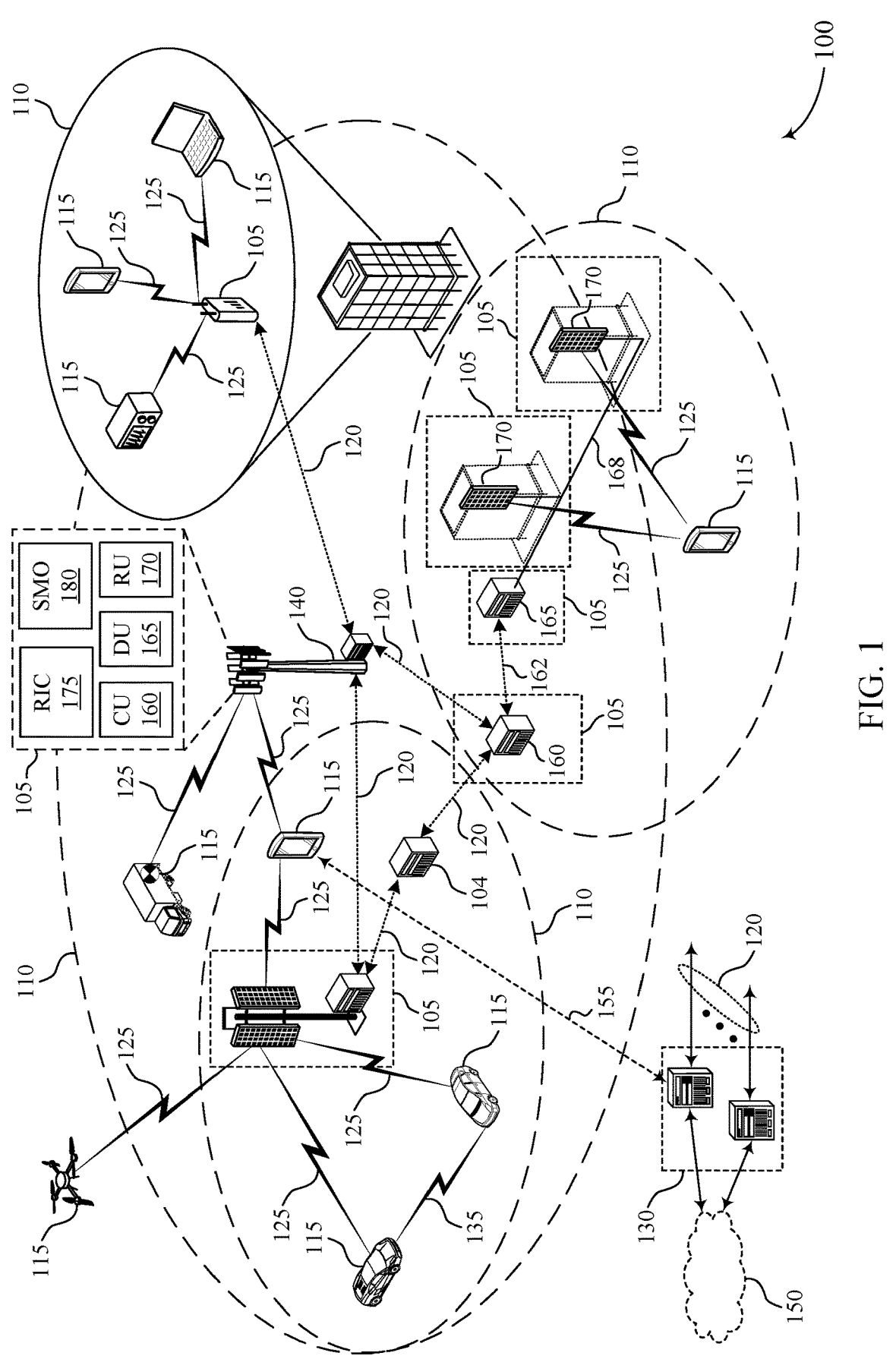
FIG. 1 illustrates an example of a wireless communications system that supports orthogonal cover code (OCC) for multiplexing transmissions by multiple user equipments (UEs) in accordance with one or more aspects of the present disclosure.

In some wireless communications systems, such as in a narrowband internet of things (NB IoT) system, a user equipment UE may transmit (e.g., uplink communication) multiple coded copies of data (e.g., repetition of data). In some examples, the repetitions may include uplink hybrid automatic repeat request (HARQ) redundancy versions (RVs). To increase uplink capacity, multiple UEs may simultaneously access resources using a non-orthogonal multiple access (NOMA), in which data from the multiple UEs is identified at a network entity of the network. In NOMA scenarios, the simultaneous transmissions from the multiple UEs may cause uplink interference at the network entity.

Moreover, identifying the data at the network entity as coming from particular UEs may be complex and time consuming. For example, identifying data from respective UEs may involve the UEs employing complex and robust scrambling schemes and complex receiver (e.g., at the base station) design.

Accordingly, as disclosed herein, transmitting UEs may use an orthogonal cover code (OCC) to enable orthogonal M order UE multiplexing without robust scrambling and/or complex receiver design at the network entity. If the total quantity or repetitions is more than 2 M, the UEs apply the M factor cover coding without increasing the amount of time-frequency resources used for the uplink transmissions. Accordingly, uplink capacity (in terms of the quantity of UEs that can be scheduled in a given time-frequency resource, with almost no interference among the UEs) is increased from the network perspective.

A network entity may transmit control signaling to a UE that indicates a multiplexing order, a repetition configuration, and an orthogonal cover coding configuration to apply to an uplink grant. The multiplexing order, M, indicates the quantity (e.g., number) of uplink transmissions from different UEs that will be multiplexed over the same time-frequency resources. The network entity may indicate the repetition configuration and the orthogonal cover coding configuration to the M UEs that will transmit multiplexed uplink transmissions. The repetition configuration may indicate a quantity of RVs associated with the uplink transmission for each of the UEs, a quantity of resource elements (REs) associated with each RV (e.g., with each repetition of each RV), and a quantity of repetitions associated with each RV. For example, a first RV (RV 0) may be repeated 4 times and a second RV (RV 2) may be repeated 4 times. Each UE performs M factor cover coding using the orthogonal cover code, and accordingly transmissions by the M UEs will be orthogonal. For example, each UE may perform the M factor cover coding using indicated rows of a Hadamard matrix, where the sized of the Hadamard matrix is based on the size of M. The M factor cover coding may be performed on a symbol by symbol basis, a slot by slot basis, a resource unit by resource unit, or an RV by RV basis.

Aspects of the disclosure are initially described in the context of wireless communications systems. Aspects of the disclosure are further illustrated by and described with reference to apparatus diagrams, system diagrams, and flowcharts that relate to orthogonal cover code for multiplexing transmissions by multiple user equipments.

FIG. 1 illustrates an example of a wireless communications system 100 that supports orthogonal cover code for multiplexing transmissions by multiple user equipments in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support orthogonal cover code for multiplexing transmissions by multiple user equipments as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)).

Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a RE may refer to resources of one symbol period (e.g., a duration of one modulation symbol) and one subcarrier, in which case the symbol period and subcarrier spacing may be inversely related. The quantity of bits carried by each RE may depend on the modulation scheme (e.g., the order of the modulation scheme, the coding rate of the modulation scheme, or both), such that a relatively higher quantity of REs (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ Seconds, for which $\Delta f_{max}$ May Represent a Supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a network entity 105 may schedule uplink transmissions from multiple UEs 115 (e.g., M UEs) using the same time-frequency resources. Transmitting UEs 115 may perform M factor cover coding of transmissions using an orthogonal cover code (e.g., an OCC) to enable orthogonal M order UE multiplexing without robust scrambling and/or complex receiver design at the network entity. If the total quantity or repetitions is more than 2 M, the UEs 115 apply the M factor cover coding without increasing the amount of time-frequency resources used for the uplink transmissions. Accordingly, uplink capacity may be increased from the network perspective.

A network entity 105 may transmit control signaling to a UE 115 that indicates a multiplexing order, a repetition configuration, and an orthogonal cover coding configuration to apply to an uplink grant. The multiplexing order, M, indicates the quantity of uplink transmissions from different UEs 115 that will be multiplexed over the same time-frequency resources. The network entity may indicate the repetition configuration and the orthogonal cover coding configuration to the M UEs 115 that will transmit multiplexed uplink transmissions. The repetition configuration may indicate a quantity of RVs associated with or included in the uplink transmission for each of the UEs 115, a quantity of REs associated with or included in each RV (e.g., the quantity of REs of each repetition of each RV), and a quantity of repetitions associated with each RV (e.g., scheduled number of times each RV is repeated). For example, a first RV (RV 0) may be repeated 4 times and a second RV (RV 2) may be repeated 4 times. Each UE 115 performs M factor cover coding using the OCC, and accordingly transmissions by the M UEs will be orthogonal. For example, each UE may perform the M factor cover coding using indicated rows or columns of a Hadamard matrix or a DFT matrix, where the size of the Hadamard matrix or DFT matrix is based on the size of M. The M factor cover coding may be performed on a symbol by symbol basis, a slot by slot basis, a resource unit by resource unit, or an RV by RV basis.

Figure 2:
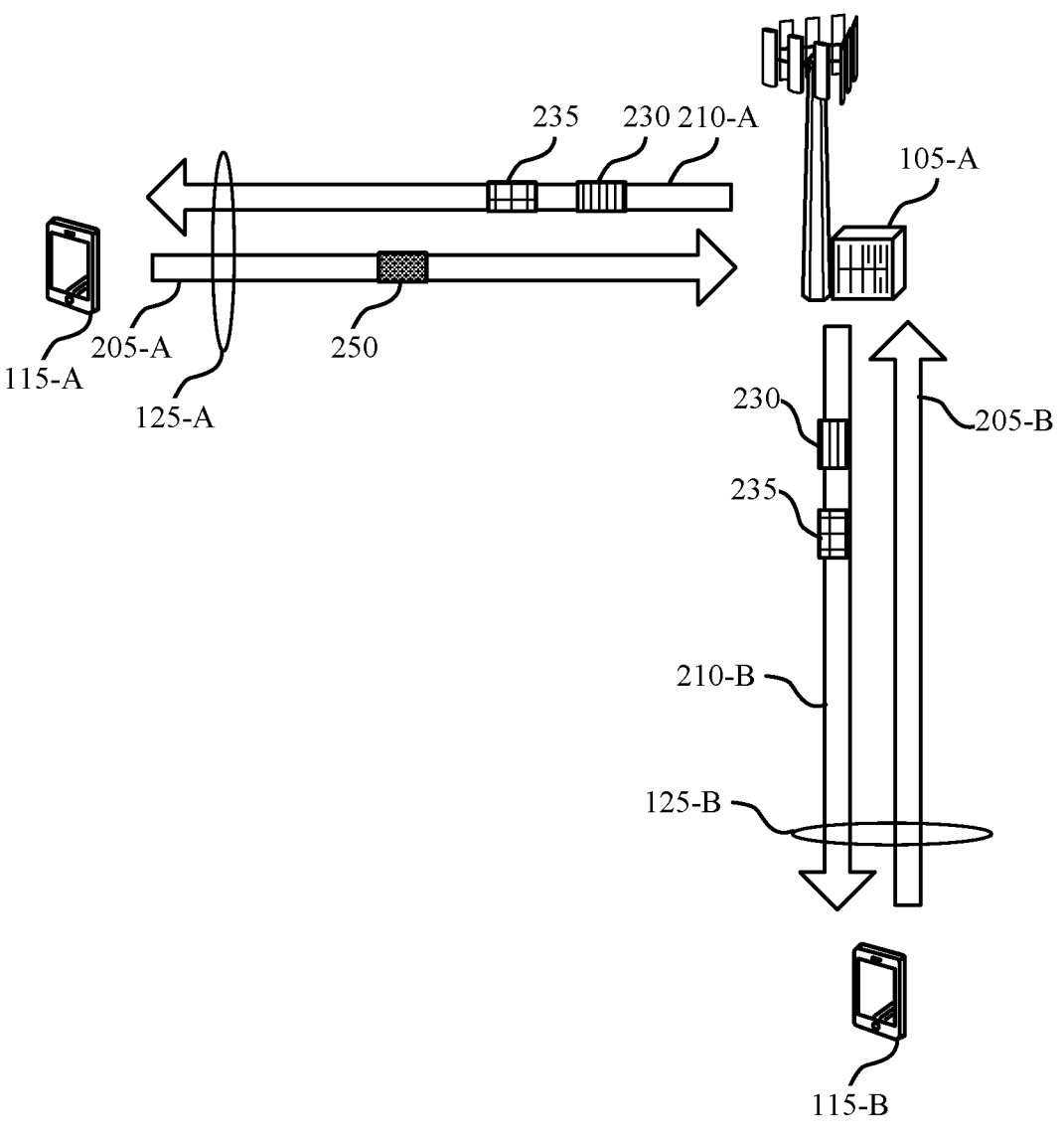
FIG. 2 illustrates another example of a wireless communications system that supports OCC for multiplexing transmissions by multiple UEs in accordance with one or more aspects of the present disclosure.

FIG. 2 illustrates an example of a wireless communications system 200 that supports OCC for multiplexing transmissions by multiple UEs 115 in accordance with one or more aspects of the present disclosure. The wireless communications system 200 may implement aspects of or may be implemented by aspects of the wireless communications system 100. For example, the wireless communications system 200 includes a UE 115-*a* and a UE 115-*b*, which may be examples of a UE 115 described with respect to FIG. 1. The wireless communications system 200 also includes a first network entity 105-*a*, which may be an example of a network entity 105 as described with respect to FIG. 1.

In some examples, the UE 115-*a* and/or the UE 115-*b* may be NB IoT devices. To ensure reliable communications where the UE 115-*a* and/or the UE 115-*b* are NB IoT devices, the UE 115-*a* and/or the UE 115-*b* may transmit multiple coded copies of data (e.g., may transmit repetitions of data). In some examples, the repetitions may include HARQ RVs. The repetitions may be used as a method or dimension to multiplex multiple uplink transmission from the UE 115-*a* and the UE 115-*b* to facilitate increasing uplink capacity (e.g., packing transmissions from multiple UEs 115 into the same time-frequency resources). The multiple UEs 115 may transmit RVs in the same time and frequency resources. However, multiplexing multiple UEs 115 may create interference at the network entity 105-*a*. As discussed herein, an orthogonal cover coding configuration may mitigate the potential interference. In particular, the data from the UEs 115 may be cover coded across RVs in an orthogonal manner. In some cases, the multiple UEs 115 (e.g., the UE 115-*a* and/or the UE 115-*b*) may also use orthogonal demodulation reference signals (DMRSs) which use their own OCC.

The UE 115-*a* may communicate with the network entity 105-*a* using a communication link 125-*a*, and the UE 115-*b* may communicate with the network entity 105-*a* using a communication link 125-*b*. The communication link 125-*a* may be an example of an NR or LTE link between the UE 115-*a* and the network entity 105-*a*. The communication link 125-*b* may be an example of an NR or LTE link between the UE 115-*b* and the network entity 105-*b*. In some examples, the communication link 125-*a* and/or the communication link 125-*b* may be examples of a non-terrestrial network (NTN) link. The communication link 125-*a* and the communication link 125-*b* may include bi-directional links that enable both uplink and downlink communications. For example, the UE 115-*a* may transmit the uplink signals 205-*a* (e.g., uplink transmissions), such as uplink control signals or uplink data signals, to the network entity 105-*a* using the communication link 125-*a* and the network entity 105-*a* may transmit downlink signals 210-*a* (e.g., downlink transmissions), such as downlink control signals or downlink data signals, to the UE 115-*a* using the communication link 125-*a*. The UE 115-*b* may transmit uplink signals 205-*b* (e.g., uplink transmissions), such as uplink control signals or uplink data signals, to the network entity 105-*a* using the communication link 125-*b* and the network entity 105-*a* may transmit downlink signals 210-*b* (e.g., downlink transmissions), such as downlink control signals or downlink data signals, to the UE 115-*b* using the communication link 125-*b*.

To mitigate interference caused uplink transmissions by the UEs 115 over the same time-frequency resources, the network entity 105-*a* may transmit control signaling 230 to the UEs 115 indicating an M factor orthogonal cover coding configuration to apply to uplink grants for the UEs that will be multiplexed in the same time-frequency resources. For example, the network entity 105-*a* may transmit second control signaling 235 that include uplink grants that schedule uplink transmissions 250 for the UE 115-*a* and the UE

115-*b* in the same time-frequency resources. The control signaling 230 may indicate a multiplexing order, a repetition configuration, and a respective orthogonal cover coding configuration to be applied to the uplink grants for the respective UEs 115. The repetition configuration may indicate a set of RVs, a quantity of REs associated with each RV of the set of RVs, and a quantity of RVs that are associated with each RV of the set of RVs. In some cases, the repetition configuration may be applied to all uplink transmissions for a given UE 115 (e.g., may be RRC configured for uplink transmissions for a given UE 115). In some cases, the repetition configuration may apply to a given indicated uplink grant.

The UEs 115 may organize data for transmission in an uplink transmission 250 according to an uplink grant, into RVs according to the control signaling received from the network entity 105. In particular, the UEs 115 may generate a set of transport blocks using the orthogonal cover coding configuration. The quantity of REs associated with each transport block of the set of transport blocks is based on the multiplexing order and the quantity of REs associated with each RV. Each transport block of the set of transport blocks may be associated with an RV of the set of RVs. Generating the transport blocks may involve generating a second set of transport blocks from a data buffer in accordance with the repetition configuration, and applying the orthogonal cover coding configuration to the second set of transport blocks to generate the set of transport blocks. After generating the transport blocks, the UEs 115 may transmit the transport blocks in uplink transmission 250 in accordance with the uplink grants.

The network entity 105-*a* may receive the transport blocks in the respective uplink transmissions 250 from each of the UEs 115 in the same time-frequency resources. The network entity 105-*a* may decode the respective sets of transport blocks based on the respective orthogonal cover coding configurations associated with the given UEs 115.

Figure 3:
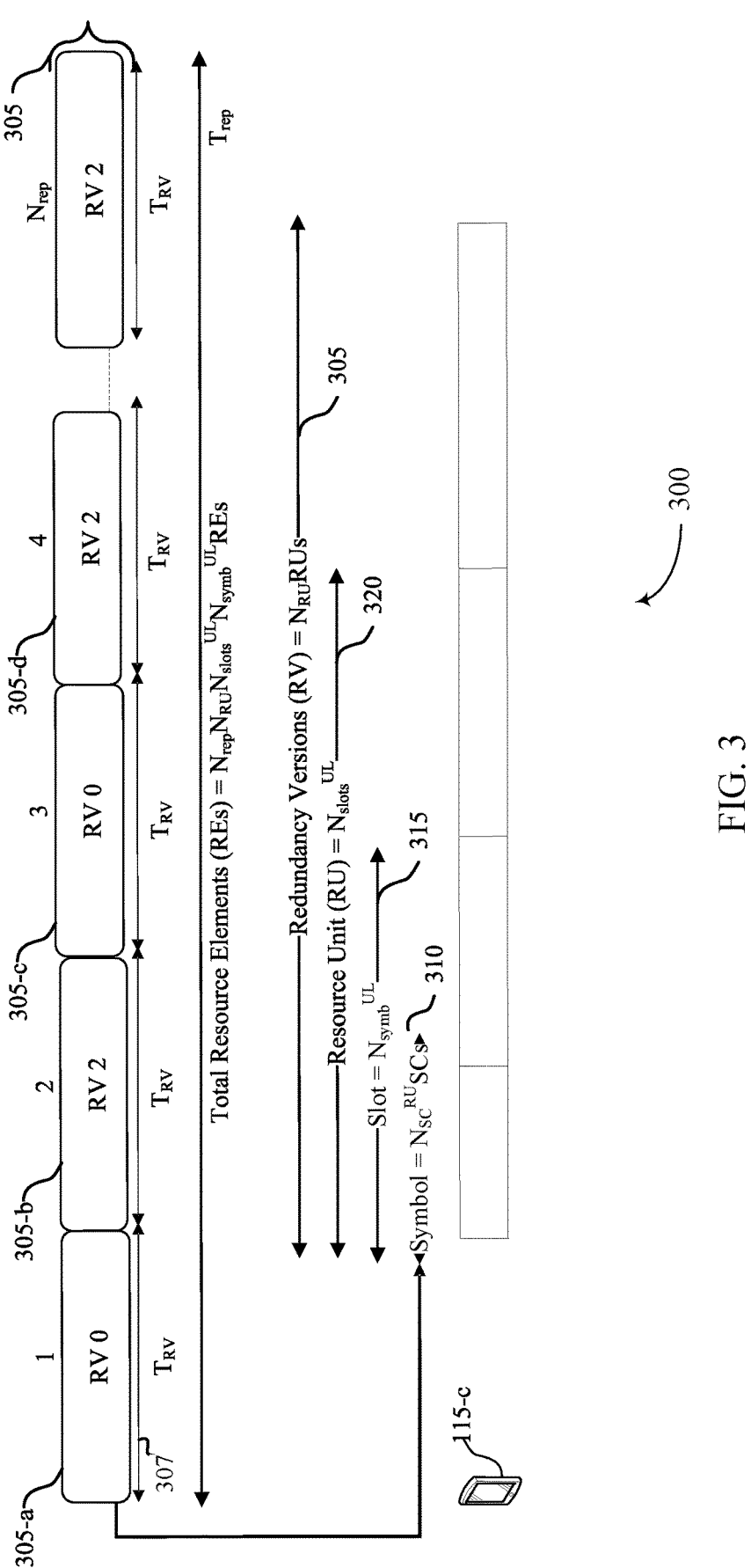
FIG. 3 illustrates an example of a resource configuration for each UE that supports OCC for multiplexing transmissions by multiple UEs in accordance with one or more aspects of the present disclosure.

FIG. 3 illustrates an example of an resource configuration 300 for each UE 115 that supports OCC for multiplexing transmissions by multiple UEs 115 in accordance with one or more aspects of the present disclosure. A UE 115-*c*, as illustrated in FIG. 3, may be an example of the UE 115 described with respect to FIG. 1. The resource configuration 300 illustrates a configuration of resources (e.g., REs) for an uplink grant for the UE 115-*c*. The resource configuration 300 may include multiple repetitions organized in accordance with RVs 305, such as a first RV 305-*a*, a second RV 305-*b*, a third RV 305-*c*, a fourth RV 305-*d*, up to N RVs 305, where N may be an integer. Each of the RVs may have a time duration 307, $T_{RV}$. For example, each RV may include a number of REs. The various RVs 305 may cycle in an alternating or interleaving manner for transmission. For example, The first RV 305-*a* and the third RV 305-*c* correspond to RV 0 while the second RV 305-*b* and the fourth RV 305-*d* correspond to RV 2, and these RV 0s and RV 2s are transmitted in an alternating pattern cycle in respective slot time duration 307 using the first RV 305-*a* through the fourth RVs 305-*d*.

The resource configuration 300 may include a total set of REs including $$N_{sc}^{RU} \times \left( N_{rep} \times N_{RU} \times \left( N_{slots}^{UL} \times N_{symb}^{UL} \right) \right) REs,$$

where $N_{RU}$ indicates the quantity of resource units (RU) to which a transport block may be mapped, $N_{rep}$ indicates the quantity of repetitions of each of the transport blocks, the $$N_{slots}^{UL} \times N_{symb}^{UL}$$

may indicate the quantity of orthogonal frequency-division multiplexing (OFDM) symbols within a resource unit (e.g., quantity of REs within a resource unit). For example, an uplink grant may schedule an uplink transmission in the $$N_{sc}^{RU} \times \left(N_{rep} \times N_{RU} \times \left(N_{slots}^{UL} \times N_{symb}^{UL}\right)\right) REs.$$

The RV repetitions may include RV cycling, where each RV 305 includes $$N_{sc}^{RU} \times N_{RU} \times \left(N_{slots}^{UL} \times N_{symb}^{UL}\right)(REs).$$

An RV 305 may include multiple resource units 320, a resource unit 320 may include multiple slots 315, and a slot 315 may include multiple symbols 310.

Figure 4:
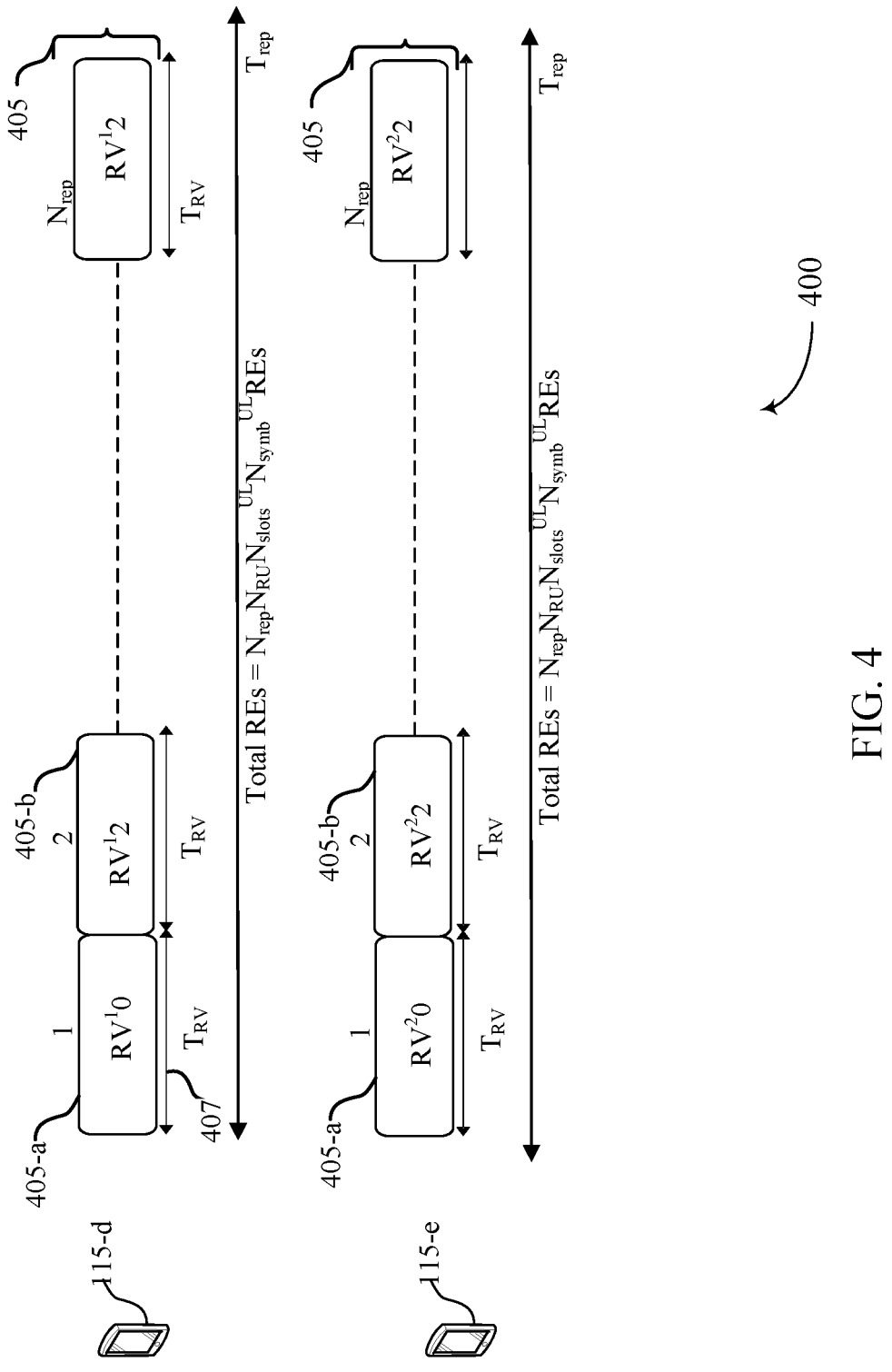
FIG. 4 illustrates an example of a resource configuration for a non-orthogonal multiple access uplink transmission in accordance with one or more aspects of the present disclosure.

FIG. 4 illustrates an example of a resource configuration 400 for a NOMA uplink transmission in accordance with one or more aspects of the present disclosure. The resource configuration 400 may include a UE 115-d and a UE 115-e, which may be examples of UE 115 as described with respect to FIG. 1. In some cases, to increase capacity, M UEs 115 may simultaneously access the same time-frequency resources, such as $$N_{sc}^{RU} \times \left(N_{rep} \times N_{RU} \times \left(N_{slots}^{UL} \times N_{symb}^{UL}\right)\right) REs$$

or resource units, where M may refer to a set of UEs 115. In FIG. 4 as illustrated, M is 2. For transmissions from the M UEs over the same time-frequency resources, a network entity 105 may use a particular receiver design to separate and identify data from the M UEs 115 as belonging to a particular UE 115. The RV$^{(i)}$n of the depicted RVs 405 may correspond to an RV index, n, at an identification of a UE, i. The $T_{RV}$ may indicate the duration of one non-OCC RV time duration 407.

In the resource configuration 400, each of the UEs 115 may transmit uplink transmissions over the same time-frequency resources, for example, including a first RV 405-a and a second RV 405-b, up to N RVs 405 (e.g., where N is an integer). Transmission of the RVs 405 by each of the UEs 115 may be alternatingly cycled (e.g., RV 0, RV 2, RV 0, RV 2, and so forth for each of the UEs 115). In the resource configuration 400, the network entity 105 receiving the uplink transmissions from the UE 115-d and the UE 115-e may perform robust scrambling or be associated with a complex receiver design to reduce interference from the multiple UEs 115. As such, in some examples, an OCC based scheme may be implemented for simultaneously transmitting UEs 115 for efficient communication of data between the UEs 115 and the network entity 105 with reduced interference.

The OCC scheme, as will be discussed herein, may be implemented across OFDM symbols or slots. Generally, the UEs 115 (e.g., transmitter) may receive all the data symbols from the output of modulator, select the OCC for the corresponding UE 115 (e.g., a row of a Hadamard matrix), which may be indicated in control signaling received from a network entity 105, perform an M factor cover coding of symbols using OCC, and transmit the OCC-configured data. The network entity may receive the OCC-configured data symbols, decode the OCC for the corresponding UE 115 (e.g., using the corresponding Hadamard matrix), and send the decoded sequence to a demodulator for calculations (e.g., log-likelihood ratio (LLR) calculations). The OCC may be performed on a symbol-wise or slot-wise basis (e.g., symbol-by-symbol or slot-by-slot).

Figure 5:
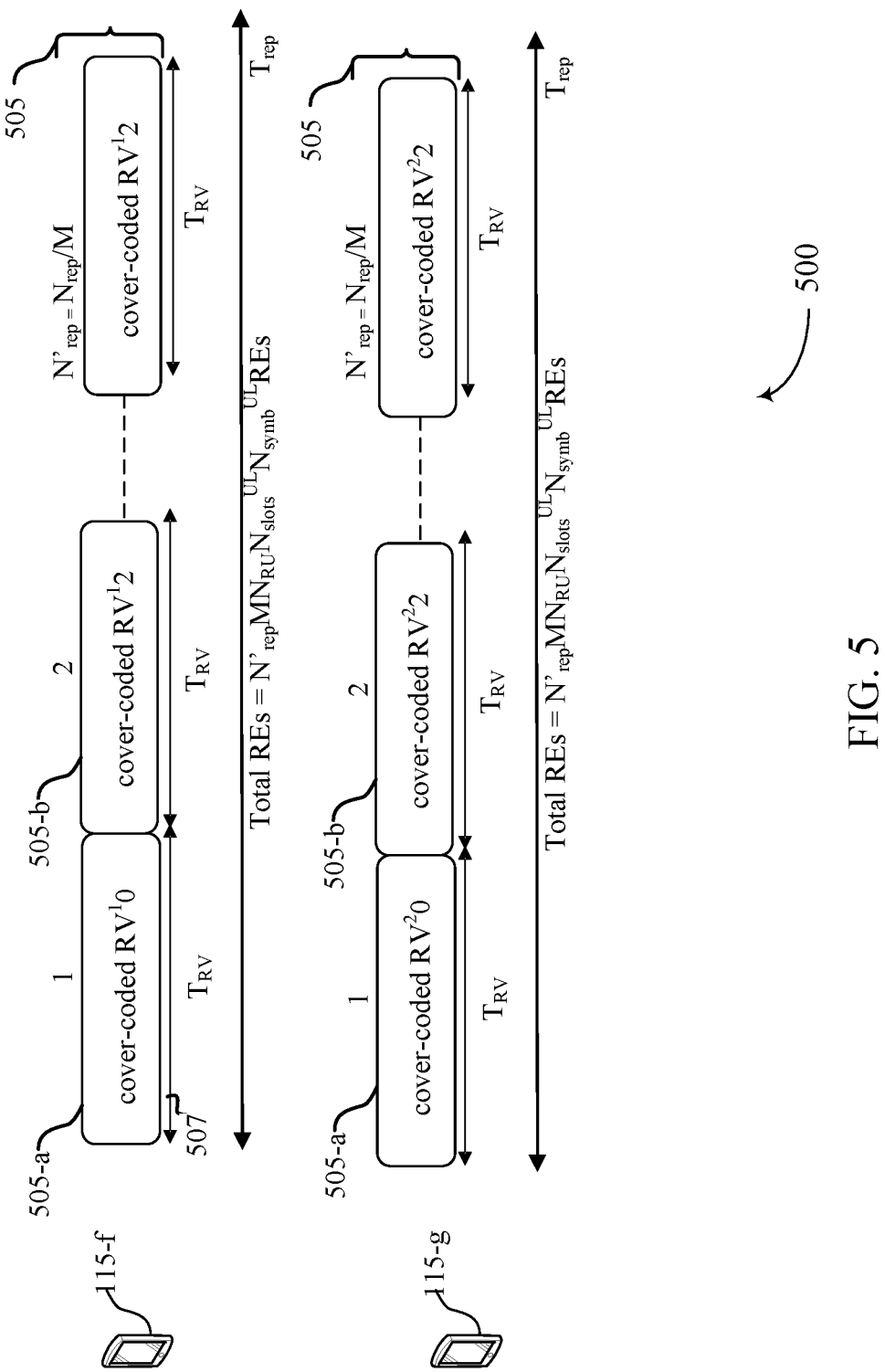
FIG. 5 illustrates a resource configuration that supports OCC for multiplexing transmissions by multiple UEs in accordance with one or more aspects of the present disclosure.

FIG. 5 illustrates an example of a resource configuration 500 that supports OCC for multiplexing transmissions by multiple UEs in accordance with one or more aspects of the present disclosure. The resource configuration 500 may include a UE 115-f and a UE 115-g, which may be examples of UE 115 as described with respect to FIG. 1. The resource configuration 500 illustrates a configuration of resources (e.g., REs) for uplink grants for the UE 115-f and the UE 115-g.

In the resource configuration 500, the UE 115-f may transmit a first RV 505-a, which may be a cover coded RV 0 (e.g., RV$^{(1)}$0) and a second RV 505-b, which may be a cover coded RV 2 (e.g., RV$^{(1)}$2). In some examples, RVs 505 in the resource configuration may be cycled. The cover coding may be in accordance with a orthogonal cover coding configuration (e.g., an orthogonal cover coding configuration, which may be indicated by a network entity 105 via control signaling, as described herein, for example, with respect to FIG. 2. A repetition configuration indicated in control signaling by a network entity 105 may indicate a set of RVs 505 (e.g., a quantity of RVs (e.g., RV0 and RV2)), a quantity of REs within each RV 505, and a quantity of repetitions associated with each RV 505 (e.g., how many times each RV 505 is repeated). The RVs may be coded out in accordance with the indicated orthogonal cover coding configuration and in some examples, the RVs may be coded out in a manner so that instead of sending RV0s and RV 2s in an alternating matter, the RV 1s may be grouped and the quantity of RV 1s in a set of RV 1s is indicated in the control signaling. Thus, RVs that are grouped by RV types (e.g., RV 1 or RV 2) are efficiently transmitted in a group in comparison to individually or in a cycling manner, as will be discussed with respect to FIG. 7. Since this configuration is requested from the network entity 105 through control signaling in downlink transmission, the network entity 105 may quickly and efficiently decode transport blocks associated with the RVs 505 that are received based on a known particular configuration indicative of the set of RVs 505, quantity of repetitions associated with each RV 505 of the multiple RVs 505 (e.g., 8 RV1s to be transmitted and 8 RV2s to be subsequently transmitted), and so forth.

To apply OCC in the resource configuration 500, the total quantity of RVs 505 for a UE 115 is to be greater than or equal to twice the quantity of multiplexed UEs (e.g., $N_{rep} \geq 2$ M, where $N_{rep}$ is the total quantity of RVs 505 for a UE 115 and M is the quantity of UEs 115 (e.g., the UE 115-f and the UE 115-g or 2 UEs 115) that are multiplexed). When the total quantity of RVs for the UE is equal to 2 M (e.g., $N_{rep} = 2$ M), the orthogonal cover coding configuration may not involve cycling the RVs 505. By applying the orthogonal cover coding configuration, the uplink capacity at the network entity 105 (e.g., base station) may increase. In particular, the quantity of UEs 115 using the same time and frequency resources for the uplink transmissions increases with respect to uplink transmissions without the orthogonal cover coding configuration. Generally, the resource configuration 500 may include quantity of REs calculated by $$N'_{rep}MN_{RU}N^{UL}_{slots}N^{UL}_{symb}$$ where $N'_{rep}$ is $N_{rep}$ divided by $M$ (e.g., $N'_{rep} = N_{rep}/M$).

In general, no additional REs may be utilized when implementing the resource configuration 500. The total quantity of REs used for non-OCC implementations may include $$N_{rep}N_{RU}N^{UL}_{slots}N^{UL}_{symb}REs$$

(e.g., total $REs$ in non-OCC = $N_{rep}N_{RU}N^{UL}_{slots}N^{UL}_{symb}$).

The total quantity of REs used for OCC implementations may include $$N'_{rep}MN_{RU}N^{UL}_{slots}N^{UL}_{symb},$$

which may be equivalent to $$\frac{N_{rep}}{M}MN_{RU}N^{UL}_{slots}N^{UL}_{symb},$$

which may be equivalent to $$N_{rep}N_{RU}N^{UL}_{slots}N^{UL}_{symb}$$

$$\left( e.g., total\ REs\ with\ OCC = \right.$$

$$\left. N'_{rep}MN_{RU}N^{UL}_{slots}N^{UL}_{symb} = \frac{N_{rep}}{M}MN_{RU}N^{UL}_{slots}N^{UL}_{symb} = N_{rep}N_{RU}N^{UL}_{slots}N^{UL}_{symb} \right).$$

A single OCC RV 505 in the resource configuration 500 may be applied across period of M non-OCC RVs 505, where a single or 1 OCC RV 505 is equivalent to M non-OCC RVs 505. (e.g., 1° C. C repetition=M non-OCC repetitions). As such, the time for transmitting at least M non-OCC RVs 505 (e.g., a grouped or a set of RVs 505 or a "super RV") may be used for OCC. A single OCC RV 505, which includes multiple RVs 505 may be referred to as a "super RV," and the super RV 505 may have a transmission duration, $$T^M_{RV},$$

of MTRV, where M is the quantity of UEs 115 and $T_{RV}$ is the slot time duration for transmitting an RV 505. For general standard compliant RV 505 cycling, such as non-OCC transmission or OCC uplink transmission, the $N'_{rep}$ may be greater than or equal to twice the quantity of M (e.g., $N_{rep} \geq 2$ M). However, when $N'_{rep}$ is equal to the quantity of M (e.g., $N_{rep}$=M), no RV cycling may be utilized in the uplink transmission.

The OCC techniques may reduce or eliminate interference (e.g., interference cancellation) better than non-OCC techniques because of orthogonality transmission, as will be discussed in detail with respect to FIG. 9. Generally, the UE 115 (e.g., transmitter) and network entity 105 (e.g., receiver or base station) configuration in an OCC implementation may be less complex to implement (e.g., implementation friendly) with respect to non-OCC implementations. In addition to performing OCC uplink transmission at an RV 505 level, or over an RV basis, the OCC transmission may also be performed at sub-RV levels or bases, such as at a resource unit level (RU level or RU basis), a slot unit level (slot level or slot basis), or at a symbol level (symbol level or symbol basis).

Figure 6:
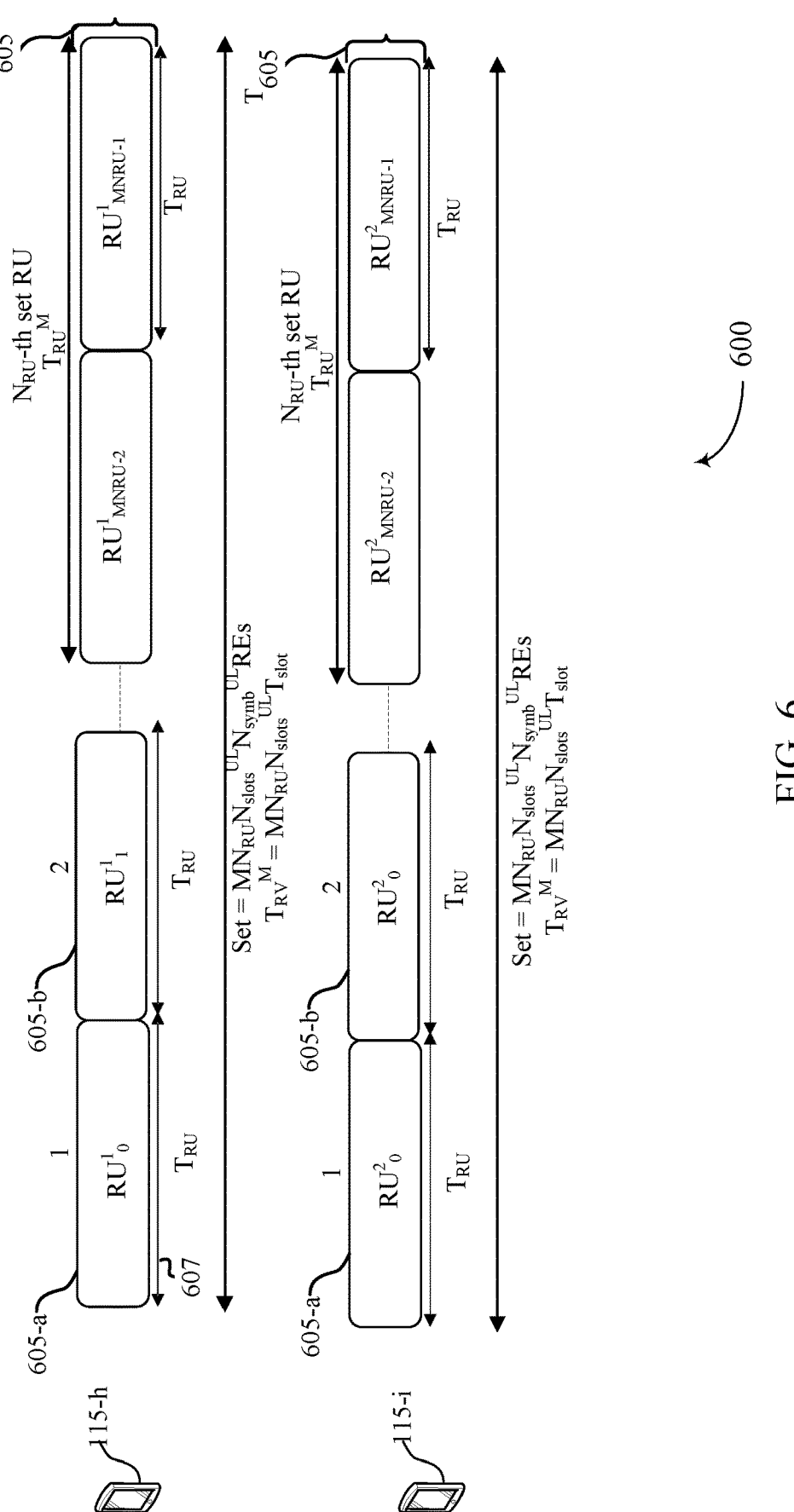
FIG. 6 illustrates an example a resource configuration that supports OCC for multiplexing transmissions by multiple UEs in accordance with one or more aspects of the present disclosure.

FIG. 6 illustrates an example of a resource configuration 600 that supports OCC for multiplexing transmissions by multiple UEs 115 in accordance with one or more aspects of the present disclosure. In the resource configuration 600, a UE 115-h and a UE 115-i may be examples of UE 115, as described with respect to FIG. 1. Although the following discussion describes data repetitions as resource units 605 (RU), which represents a particular embodiment, the techniques described herein may additionally or alternatively apply to other levels of data repetitions, such as RVs, symbols, or slots. In some examples, the UE 115-h and the UE 115-i may each transmit a first resource unit 605-a and a second resource unit 605-b in a set of resource units 605 (e.g., a super resource unit (super RU)). In some examples, another OCC-application may be implemented within the super RU, resulting in a Kronecker product of the elements of the first resource unit 605-a in the super RU with the OCC of length M, to create the super RU of length M. The resource configuration 600 illustrates a configuration of resources (e.g., REs) for uplink grants for the UE 115-h and the UE 115-i.

In some examples, the format of the uplink transmission (e.g., an uplink shared channel (PUSCH) transmission) may be equal to 1, the quantity of resource units, $N_{RU}^{SC}$, may be equal to 1 (e.g., $N_{RU}^{SC}$=1), the quantity of slots, $N_{slots}^{UL}$, may be equal to 16 (e.g., $N_{slots}^{UL}$=16), and the quantity of symbols, $N_{symb}^{UL}$, may be equal to 7 (e.g., $N_{symb}^{UL}$=7). The Δf, which is the frequency, may be equal to 3.75 kilohertz (e.g., Δf=3.75 kHz), and a slot time duration of a slot, $T_{slot}$, 607 may be equal to 2 milliseconds (ms) (e.g., $T_{slot}$=2 ms). A single non-OCC RV (e.g., non-OCC RV) includes $N_{RU}$ RUs, so a set of RVs (e.g., 1 super RV) may include of $MN_{RU}$ RUs. A resource unit 605 (e.g., 1 or single RU) may include a quantity of slots and symbols, $$N_{slots}^{UL}N_{symb}^{UL}$$ of $REs$, where $N_{RU}$ may include $N_{RU}N_{slots}^{UL}N_{symb}^{UL}$ $REs$, and thus, $MN_{RU}$ RUs may include $$MN_{RU}N_{slots}^{UL}N_{symb}^{UL}REs.$$

An resource unit time duration, $T_{RU}$, may include a quantity of slots and slot time duration, $$N_{slots}^{UL} T_{slot} \quad (e.g., T_{RU} = N_{slots}^{UL}).$$

The quantity of resource units 605 and the resource unit time duration, $N_{RU}$ RU duration, may include a quantity of resource units, quantity of slots, and the slot time duration $$(e.g., N_{RU} N_{slots}^{UL} T_{slot}).$$

The quantity of UEs 115, quantity of resource units 605, and resource unit duration, may include the quantity of UEs 115, the quantity of resource units 605, quantity of slots, and resource unit slot duration $$(e.g., T_M^{RU} = M N_{RU} N_{slots}^{UL} T_{slot}).$$

The M resource units may be grouped to form a large set of resource units (e.g., super RU). As such, the one large group set of RVs may include a quantity of units of super resource units (e.g., 1 super RV=$N_{RU}$ super RUs). The $$RU_1^i$$

may indicate the resource unit index l at UE i. Generally, and as will be discussed with respect to FIG. 8, grouping may be performed by applying a matrix to the symbols of the slot, resource units, or RV.

Figure 7:
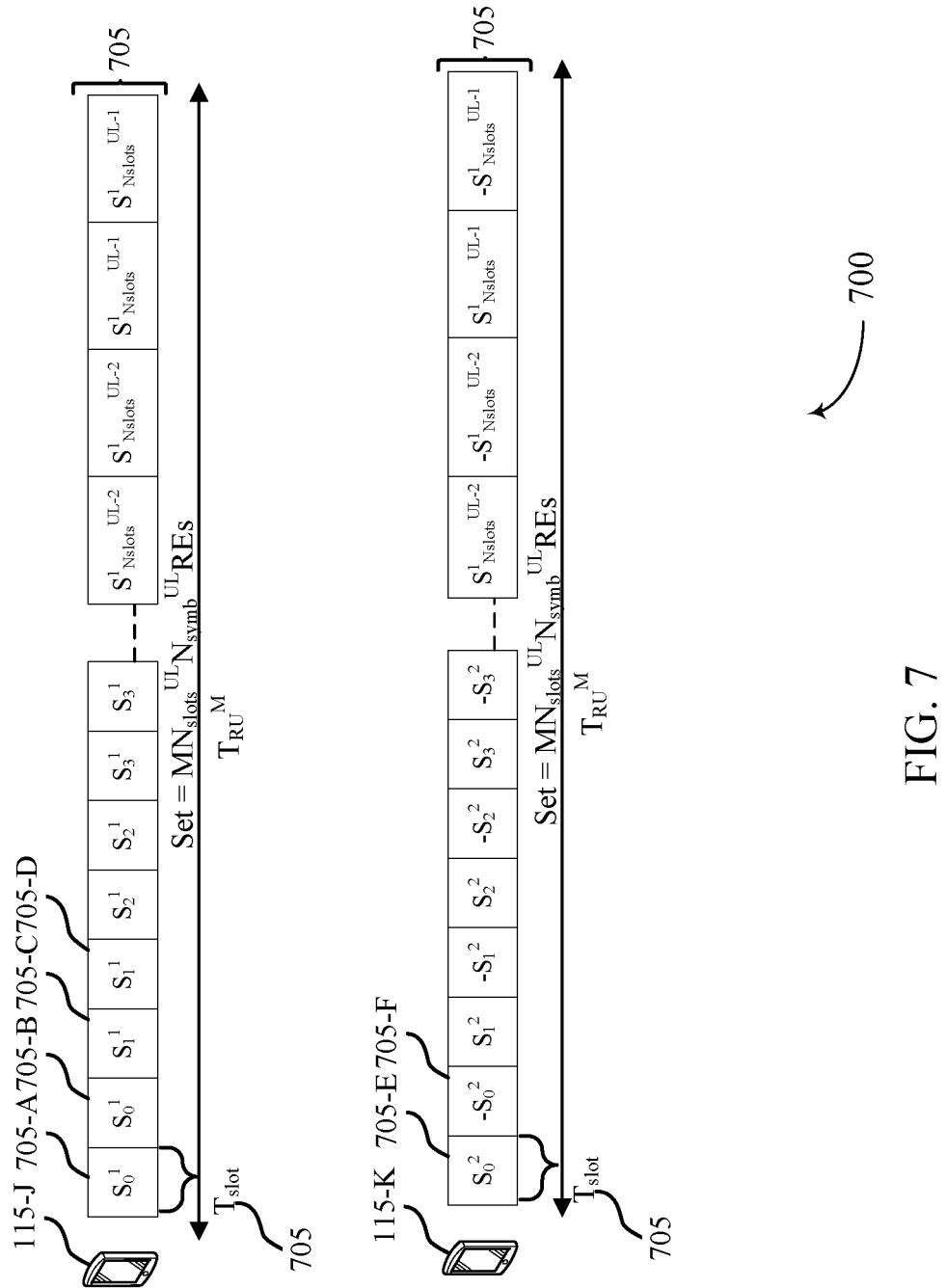
FIG. 7 illustrates an example of a resource configuration that supports OCC for multiplexing transmissions by multiple UEs in accordance with one or more aspects of the present disclosure.

FIG. 7 illustrates an example of a resource configuration 700 that supports OCC for multiplexing transmissions by multiple UEs 115 in accordance with one or more aspects of the present disclosure. The resource configuration 700 may be performed at a resource unit level or per a resource unit basis. The resource configuration 700 may include a UE 115-j and a UE 115-k, which may be examples of UE 115, as described with respect to FIG. 1. Although the following description describes the OCC implementation at a slot level, which represents a particular embodiment, the implementation may be performed at a symbol level or a slot level for resource units or RVs. For example, the OCC implementation at the slot level may result in a super slot for each slot, and the super slot may be generated by a Kronecker product of a slot element with OCC. A super-slot may ultimately be mapped to a super RV. Each granularity of the RV (e.g., RV, RU, slot, or symbol), may include mapping the respective element to the largest element or super RV, which may be the size of M RVs. The resource configuration 700 illustrates a configuration of resources (e.g., REs) for uplink grants for the UE 115-j and the UE 115-k. In some examples, for the OCC implementation, a slot level OCC with a rows of a 2×2 Hadamard matrix may be applied for two UEs 115.

In some examples, the resource configuration 700 may include a wireless system with a NPUSCH used for communication. In this example, the NPUSCH format may be 1 (e.g., NPUSCH Format=1), the quantity of resource units, $N_{RU}^{SC}$, may be 1 (e.g., $N_{RU}^{SC}$=1), the quantity of slots, $N_{slots}^{UL}$, may be 16 (e.g., $N_{slots}^{UL}$=16), the quantity of symbols may be 7 (e.g., $N_{symb}^{UL}$=7), and the frequency may be 3.75 kHz (e.g., $\Delta f$=3.75 kHz), and the slot duration, $T_{slot}$, may be 2 ms (e.g., $T_{slot}$=2 ms).

The M slots may be grouped together to form a set of M resource unit or 1 super resource unit, where 1 resource unit=$N_{symb}^{UL} N_{slots}^{UL}$ REs. The time duration of 1 super RU is $$T^M RU = M N_{slots}^{LL} T_{slot}.$$

In the depicted example, the UEs 115 are transmitting slots that have been configured with OCC. Specifically, the UE 115-j may transmit a first slot 705-a and a second slot 705-b. The notation of the slots 705 correspond to $$S_k^i,$$

which includes slot index k at UE i. So the first slot 705-a and the second slot 705-b both correspond to a slot index 1 for UE 115-j (e.g., UE 1 or $S^1$). That is, the slots 705 are grouped into a set by index, so that the transmission does not cycle slots having different indices.

A matrix may be applied to implement the OCC coding to the slots 705, as described with respect to FIG. 2 and as will be described herein. The slots of UE 115-j may apply a [1,1] vector of the matrix to the sets of slots and index. However, as part of the OCC coding, UE 115-k may apply a vector of [1, −1] to the slot sequence. For the UE 115-k, the first slot 705-e and the second slot 705-f have an index of slot 0 for UE 115-k (e.g., UE 2 or $S^2$). The second slot 705-e is formatted as a negative slot, where −1 is applied.

Figure 8:
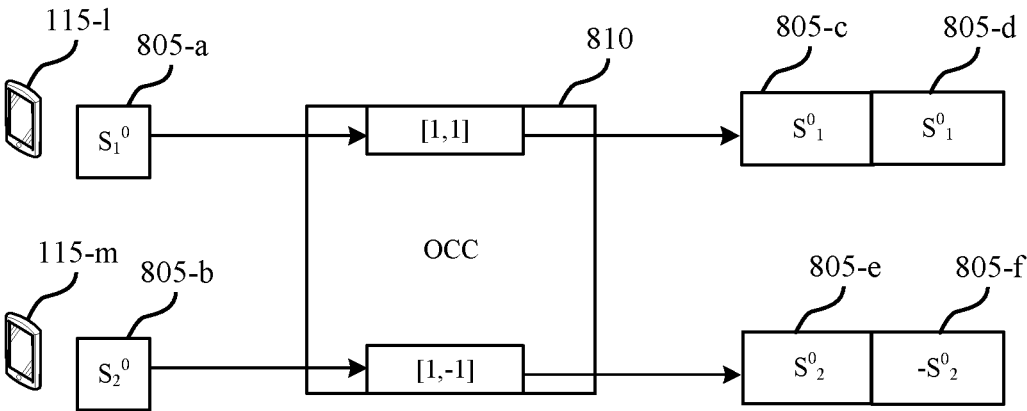
FIG. 8 illustrates an example of an encoding configuration that supports OCC for multiplexing transmissions by multiple UEs in accordance with one or more aspects of the present disclosure.

FIG. 8 illustrates an example of an encoding configuration 800 for multiplexing transmissions by multiple UEs 115 in accordance with one or more aspects of the present disclosure. The UE 115-1 and the UE 115-m may be examples of UE 115, as described with respect to FIG. 1. The encoding configuration 800 may be used to cover code REs/slots/resource units/RVs in accordance with an orthogonal cover coding configuration to generate orthogonal transmissions for the UE 115-1 and the UE 115-m as described herein.

In the encoding configuration the UE 115-1 may input a data slot 805-a to a Hadamard matrix 810 and the UE 115-m may input a second data slot 805-d to the Hadamard matrix 810. The Hadamard matrix 810 may be a 2×2 matrix (e.g., two rows and two columns). The first row may correspond to a vector [1,1] that, when given as an input the data slot 805-a, outputs a product including a third slot 805-c and a fourth slot 805-d. The third slot 805-c and the fourth slot 805-d may have the same values as the input of first slot 805-a since the vector is a [1,1].

The second row of the matrix may correspond to a vector of [1,−1]. The second row, when given as an input the data slot 805-b, outputs a product including a fifth slot 805-e and a sixth slot 805-f. The sixth slot 805-f is a negative output of the input since a negative integer is applied in the vector of the matrix. Applying the matrix in this manner to the input slots (e.g., or other level of data such as symbols, resource units, or RVs), produces orthogonal outputs, and accordingly, transmissions from the UE 115-1 and the UE 115-m are orthogonal and therefore do not interfere with each other.

The encoding using the Hadamard matrix 810 may be applied to a set of slots for each UE (e.g., slot $$S_k^i,$$

in which the data slot is k at UE i). In some examples, each slot may have 6 data symbols and 1 DMRS, and the number of symbols per slot may be 7 (e.g., NsymbUL=7 [1]). The input to the encoding matrix may include $$s_i^0, s_i^1, s_i^2, s_i^3, s_i^4, s_i^5.$$

In some examples, involving transmission at a symbol level, the input to the encoding matrix may be in symbols instead of slots, such as $$S_k^j,$$

in which the data symbol is j at UE I, where j=0 . . . NsymbUL−2.

In some examples, for example for four UEs 115, the matrix may be a 4×4 Hadamard matrix having four rows and four columns. Similarly, the OCC implementation for the 4 UEs 115 may involve a set of RVs (e.g., super RV) or repetition level, and in some cases, may involve a slot level implementation. In such examples, the matrix may include a first row vector of [1, 1, 1, 1], a second row vector of [1, −1, 1, −1], a third row vector [1, 1, −1, −1], and a fourth row vector [1, −1, −1, 1].

Figure 9:
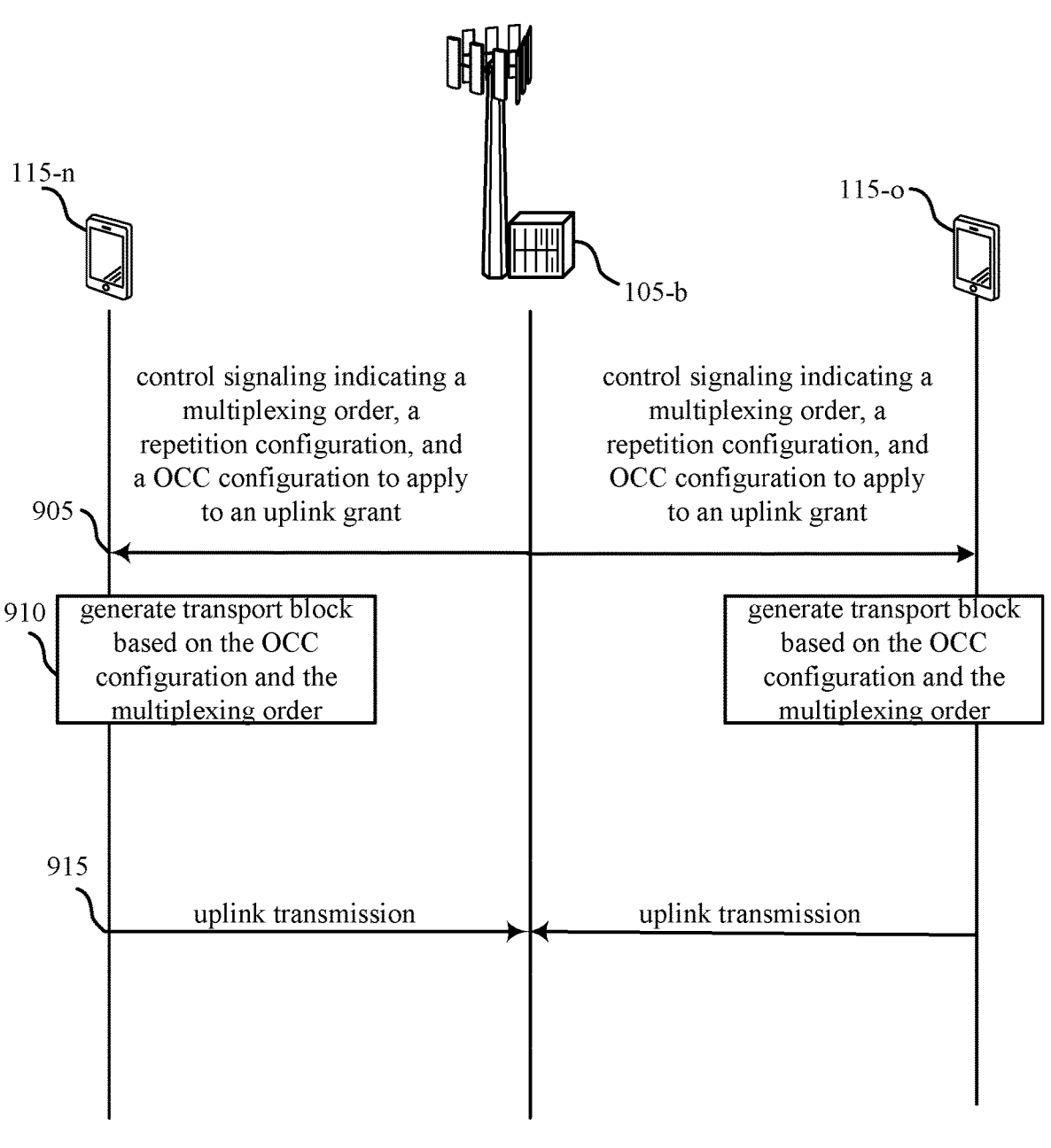
FIG. 9 illustrates an example of a process flow that supports OCC for multiplexing transmissions by multiple UEs in accordance with one or more aspects of the present disclosure.

FIG. 9 illustrates an example of a process flow 900 that supports OCC for multiplexing transmissions by multiple UEs 115 in accordance with one or more aspects of the present disclosure. The process flow 900 may involve two or more UEs 115, such as UE 115-*n* and UE 115-*o*, which may be examples of UEs 115, as described with respect to FIG. 1. The process flow 900 may also involve a network entity 105-*b*, which may be an example of network entity 105, as described with respect to FIG. 1.

In the following description of the process flow 900, the operations between the network entity 105-*b* and the UE 115-*n* may be transmitted in a different order than the example order shown, or the operations performed by the network entity 105-*b* and the UE 115-*o* may be performed in different orders or at different times. Some operations may also be omitted from the process flow 900, and other operations may be added to the process flow 900.

At 905, the UEs 115 may receive, from the network entity 105-*b*, control signaling indicating a multiplexing order, a repetition configuration, and an orthogonal cover coding configuration to apply to an uplink grant. The repetition configuration indicates a set of RVs, a first quantity of resource elements associated with each repetition of each redundancy version of the set of redundancy versions, and a quantity of repetitions associated with each redundancy version of the set of redundancy versions, and the orthogonal cover coding configuration is based on the multiplexing order.

At 910, the UEs 115 may generate a transport block including one or more instances of the set of redundancy versions, the one or more instances of the set of redundancy versions mapped to a set of resource elements of the transport block across time based on the multiplexing order and the orthogonal cover coding configuration. For example, the duration of a super RV (e.g., quantity of REs associated with each instance of each RV in the transport block) is equal to the duration of a normal RV (e.g., the quantity of REs in each RV in the repetition configuration) times the multiplexing order.

At 915, the UEs 115 may transmit, to the network entity 105-*b*, an uplink transmission including the set of transport blocks in accordance with the uplink grant. In some examples, the UEs 115 may further receive, from the network entity 105-*b*, an indication that the set of resource elements is associated with the uplink grant, and the UEs 115 may map each instance of each redundancy version of the set of redundancy versions to subsets of resource elements of the set of resource elements. The quantity of resource elements of each subset may be equal to the first quantity (of resource elements associated with each repetition of each redundancy version of the set of redundancy versions) multiplied by the multiplexing order. In some examples, the UE 115-*n* may receive, from the network entity 105-*b*, a second uplink grant associated with a second set of resource elements, where the second set of resource elements includes a same quantity of resource elements as the set of resource elements, and a second multiplexing order associated with the second uplink grant is one. The UE 115-*n* may generate a second transport block in accordance with the repetition configuration, and may transmit, to the network entity 105-*b*, a second uplink transmission comprising the second transport block in accordance with the second uplink grant, where a first data capacity of the transport block is equal to a second data capacity of the second transport block.

In some examples, generating the transport block may include generating the set of redundancy versions from a data buffer, mapping sets of repetitions of the set of redundancy versions to respective consecutive subsets of resource elements of the set of resource elements across time, where a quantity of repetitions of each of the sets of repetitions is based on the multiplexing order; and applying the orthogonal cover coding configuration to the sets of repetitions of the set of redundancy versions mapped to the respective consecutive subsets of resource elements across time to generate the transport block. In some examples, the OCC configuration may be applied on a per symbol basis, a per slot basis, a per resource unit basis, or a per redundancy version basis.

In some examples, receiving the control signaling may include indicating the orthogonal cover coding configuration including rows or columns associated with a Hadamard matrix or a DFT matrix, and the control signaling indicates which rows or columns of the Hadamard matrix or the DFT matrix are associated with the UEs 115. In some examples, the control signaling may indicate which rows or columns of the Hadamard matrix or the DFT matrix are associated with the UE 115 (e.g., which row or column of the matrix to apply for the orthogonal cover coding for a given UE 115). A size of the Hadamard matrix or the DFT matrix may be associated with the multiplexing order. For example, the Hadamard matrix may be as large as the multiplexing order. As such, for 2 UEs 115 multiplexing, a 2 row matrix may be used, for 4 UEs multiplexing, a 4 row matrix may be used, and so forth.

In some examples, receiving the control signaling includes receiving a first control message indicating the repetition configuration, and receiving a second control message indicating the uplink grant, the multiplexing order, and the orthogonal cover coding configuration. In some examples, the total quantity of repetitions may be at least twice the multiplexing order, and the total quantity of repetitions may be the quantity of repetitions associated with each RV multiplied by a quantity of RVs in the set of RVs. In some examples, network entity 105-b may be a non-terrestrial network entity. In some examples, the control signaling may be received via RRC or a MAC-CE or a combination thereof (e.g., the repetition configuration may be indicated via RRC and the uplink grant, the multiplexing order, and the orthogonal cover coding configuration may be indicated via a MAC-CE).

Figure 10:
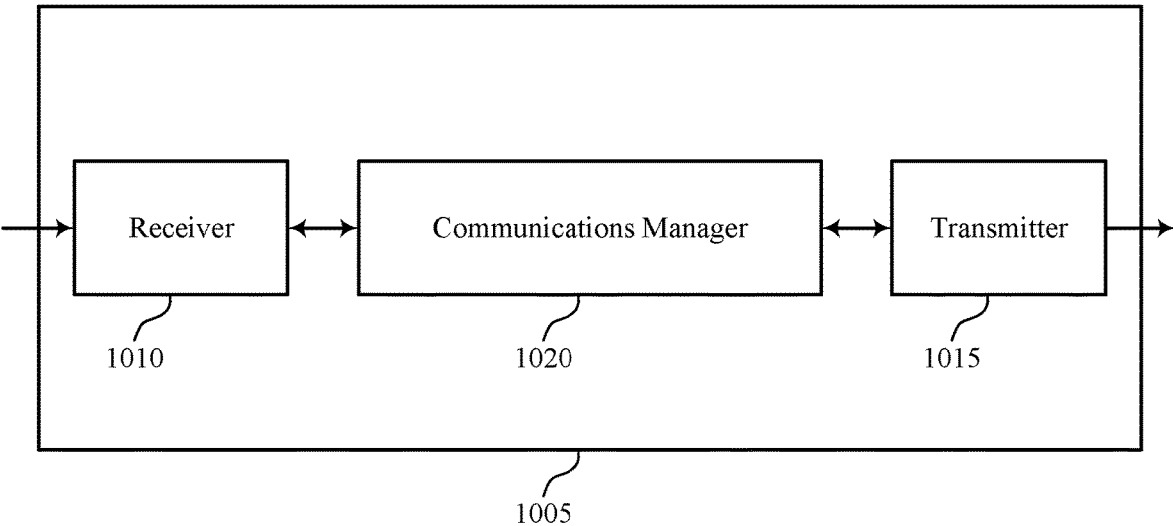
FIGS. 10 and 11 illustrate block diagrams of devices that support OCC for multiplexing transmissions by multiple UEs in accordance with one or more aspects of the present disclosure.

FIG. 10 illustrates a block diagram 1000 of a device 1005 that supports orthogonal cover code for multiplexing transmissions by multiple UEs 115 in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to OCC for multiplexing transmissions by multiple UEs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to OCC for multiplexing transmissions by multiple UEs). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of OCC for multiplexing transmissions by multiple UEs as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. For example, the communications manager 1020 may be configured as or otherwise support a means for receiving, from a network entity, control signaling indicating a multiplexing order, a repetition configuration, and an orthogonal cover coding configuration to apply to an uplink grant, where the repetition configuration indicates a set of RVs, a first quantity of REs associated with each repetition of each RV of the set of RVs, and a quantity of repetitions associated with each RV of the set of RVs, and where the orthogonal cover coding configuration is based on the multiplexing order. The communications manager 1020 may be configured as or otherwise support a means for generating a transport block including one or more instances of the set of RVs, the one or more instances of the set of RVs mapped to a set of REs of the transport block across time based on the multiplexing order and the orthogonal cover coding configuration. The communications manager 1020 may be configured as or otherwise support a means for transmitting, to the network entity, an uplink transmission including the transport block in accordance with the uplink grant.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for increasing uplink capacity while reducing interference from simultaneous transmissions from UEs 115. In particular, by applying the orthogonal cover coding configuration, the uplink capacity at the network entity 105 may increase. The quantity of UEs 115 using the same time and frequency resources for the uplink transmissions increases with respect to uplink transmissions without the orthogonal cover coding configuration. Moreover, data from the different UEs 115 may be efficiently decoded to identify respective UEs 115 that are simultaneously transmitting.

Figure 11:
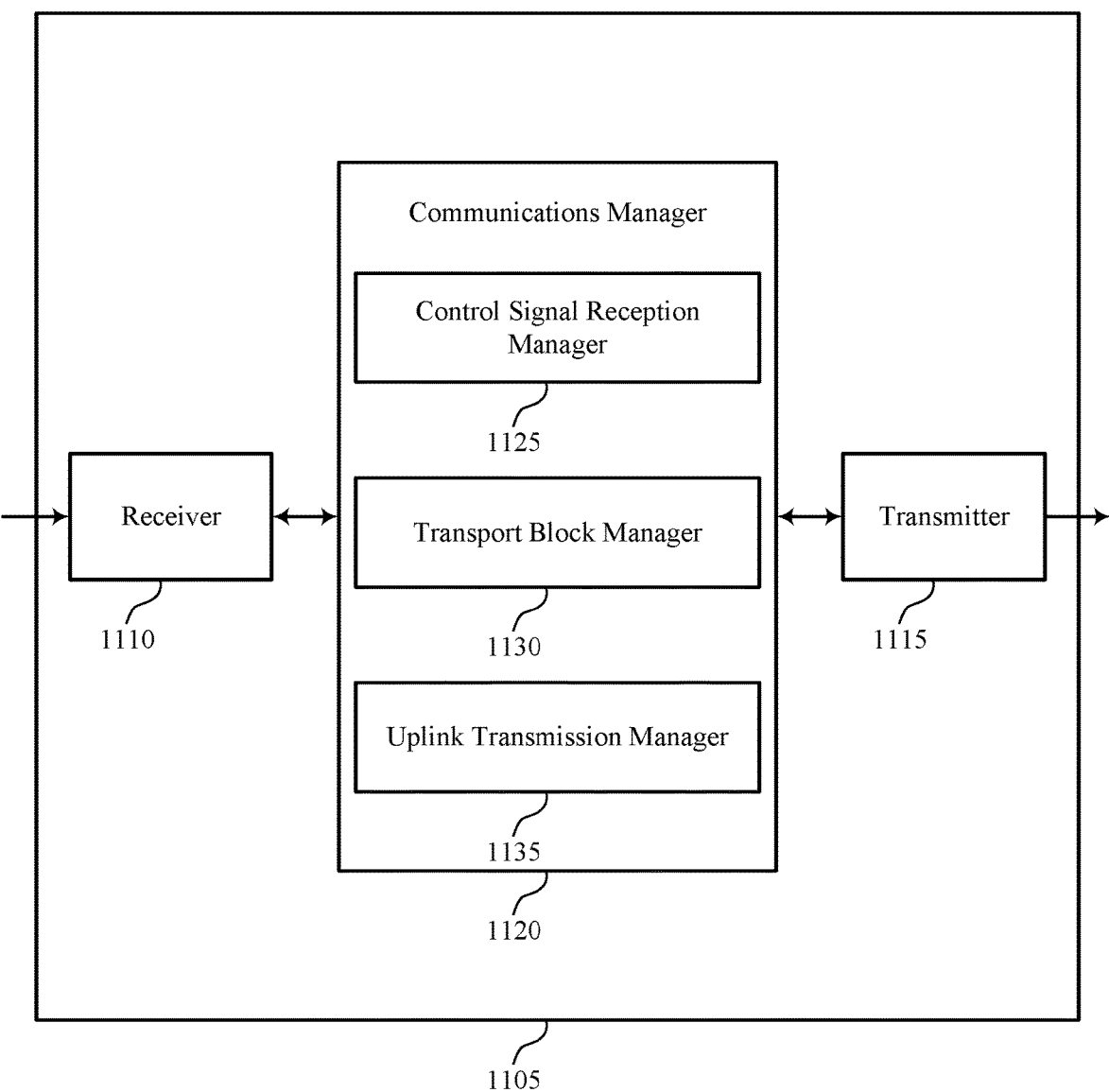

FIG. 11 illustrates a block diagram 1100 of a device 1105 that supports OCC for multiplexing transmissions by multiple UEs 115 in accordance with one or more aspects of the present disclosure. The device 1105 may be an example of aspects of a device 1005 or a UE 115 as described herein.

The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to OCC for multiplexing transmissions by multiple UEs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to OCC for multiplexing transmissions by multiple UEs). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of OCC for multiplexing transmissions by multiple UEs as described herein. For example, the communications manager 1120 may include a control signal reception manager 1125, a transport block manager 1130, an uplink transmission manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. The control signal reception manager 1125 may be configured as or otherwise support a means for receiving, from a network entity, control signaling indicating a multiplexing order, a repetition configuration, and an orthogonal cover coding configuration to apply to an uplink grant, where the repetition configuration indicates a set of RVs, a first quantity of REs associated with each repetition of each RV of the set of RVs, and a quantity of repetitions associated with each RV of the set of RVs, and where the orthogonal cover coding configuration is based on the multiplexing order. The transport block manager 1130 may be configured as or otherwise support a means for generating a transport block including one or more instances of the set of RVs, the one or more instances of the set of RVs mapped to a set of REs of the transport block across time based on the multiplexing order and the orthogonal cover coding configuration. The uplink transmission manager 1135 may be configured as or otherwise support a means for transmitting, to the network entity, an uplink transmission including the transport block in accordance with the uplink grant.

Figure 12:
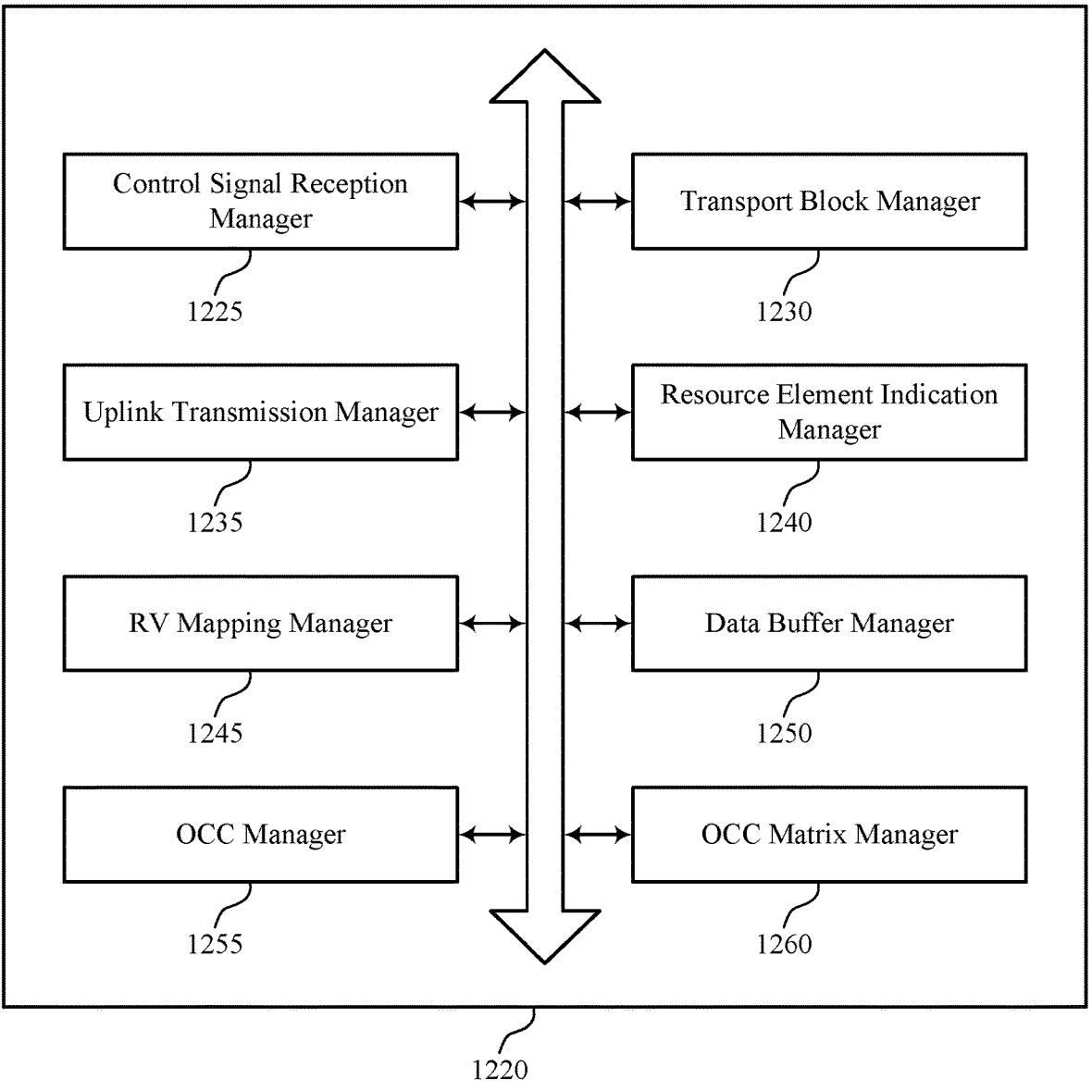
FIG. 12 illustrates a block diagram of a communications manager that supports OCC for multiplexing transmissions by multiple UEs in accordance with one or more aspects of the present disclosure.

FIG. 12 illustrates a block diagram 1200 of a communications manager 1220 that supports OCC for multiplexing transmissions by multiple UEs 115 in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of OCC for multiplexing transmissions by multiple UEs as described herein. For example, the communications manager 1220 may include a control signal reception manager 1225, a transport block manager 1230, an uplink transmission manager 1235, a RE indication manager 1240, an RV mapping manager 1245, a data buffer manager 1250, a OCC manager 1255, a OCC matrix manager 1260, or any combination thereof. Each of these components may communicate, directly or indirectly, with one another (e.g., via one or more buses).

The communications manager 1220 may support wireless communications at a UE in accordance with examples as disclosed herein. The control signal reception manager 1225 may be configured as or otherwise support a means for receiving, from a network entity, control signaling indicating a multiplexing order, a repetition configuration, and an orthogonal cover coding configuration to apply to an uplink grant, where the repetition configuration indicates a set of RVs, a first quantity of REs associated with each repetition of each RV of the set of RVs, and a quantity of repetitions associated with each RV of the set of RVs, and where the orthogonal cover coding configuration is based on the multiplexing order. The transport block manager 1230 may be configured as or otherwise support a means for generating a transport block including one or more instances of the set of RVs, the one or more instances of the set of RVs mapped to a set of REs of the transport block across time based on the multiplexing order and the orthogonal cover coding configuration. The uplink transmission manager 1235 may be configured as or otherwise support a means for transmitting, to the network entity, an uplink transmission including the transport block in accordance with the uplink grant.

In some examples, the RE indication manager 1240 may be configured as or otherwise support a means for receiving, from the network entity, an indication that the set of REs is associated with the uplink grant. In particular, the uplink grant may be scheduled in a set of time-frequency REs. In some examples, the RV mapping manager 1245 may be configured as or otherwise support a means for mapping each instance of each RV of the set of RVs to subsets of REs of the set of REs, a second quantity of REs of each subset being the first quantity multiplied by the multiplexing order.

In some examples, the control signal reception manager 1225 may be configured as or otherwise support a means for receiving, from the network entity, a second uplink grant associated with a second set of REs, where the second set of REs includes a same quantity of REs as the set of REs, and where a second multiplexing order associated with the second uplink grant is one. In some examples, the transport block manager 1230 may be configured as or otherwise support a means for generating a second transport block in accordance with the repetition configuration. In some examples, the uplink transmission manager 1235 may be configured as or otherwise support a means for transmitting, to the network entity, a second uplink transmission including the second transport block in accordance with the second uplink grant, where a first data capacity of the transport block is equal to a second data capacity of the second transport block.

In some examples, to support generating the transport block, the data buffer manager 1250 may be configured as or otherwise support a means for generating the set of RVs from a data buffer. In some examples, to support generating the transport block, the RV mapping manager 1245 may be configured as or otherwise support a means for mapping sets of repetitions of the set of RVs to respective consecutive subsets of REs of the set of REs across time, where a quantity of repetitions of each of the sets of repetitions is based on the multiplexing order. In some examples, to support generating the transport block, the OCC manager 1255 may be configured as or otherwise support a means for applying the orthogonal cover coding configuration to the sets of repetitions of the set of RVs mapped to the respective consecutive subsets of REs across time to generate the transport block.

In some examples, to support applying the orthogonal cover coding configuration, the OCC manager 1255 may be configured as or otherwise support a means for applying the orthogonal cover coding configuration on a per symbol basis, a per slot basis, a per resource unit basis, or a per RV basis.

In some examples, to support receiving the control signaling, the OCC matrix manager 1260 may be configured as or otherwise support a means for receiving the control signaling indicating the orthogonal cover coding configuration includes rows or columns associated with a Hadamard matrix or a discrete Fourier transform matrix, and where the control signaling indicates which rows or columns of the Hadamard matrix or the discrete Fourier transform matrix are associated with the UE.

In some examples, a size of the Hadamard matrix or the discrete Fourier transform matrix is associated with the multiplexing order.

In some examples, to support receiving the control signaling, the control signal reception manager 1225 may be configured as or otherwise support a means for receiving a first control message indicating the repetition configuration. In some examples, to support receiving the control signaling, the control signal reception manager 1225 may be configured as or otherwise support a means for receiving a second control message indicating the uplink grant, the multiplexing order, and the orthogonal cover coding configuration.

In some examples, a total quantity of repetitions is at least twice the multiplexing order, and the total quantity of repetitions is the quantity of repetitions associated with each RV multiplied by a quantity of RVs in the set of RVs.

In some examples, the network entity is a non-terrestrial network entity.

In some examples, to support receiving the control signaling, the control signal reception manager 1225 may be configured as or otherwise support a means for receiving the control signaling via RRC signaling, a MAC control element (MAC-CE), or a combination thereof.

Figure 13:
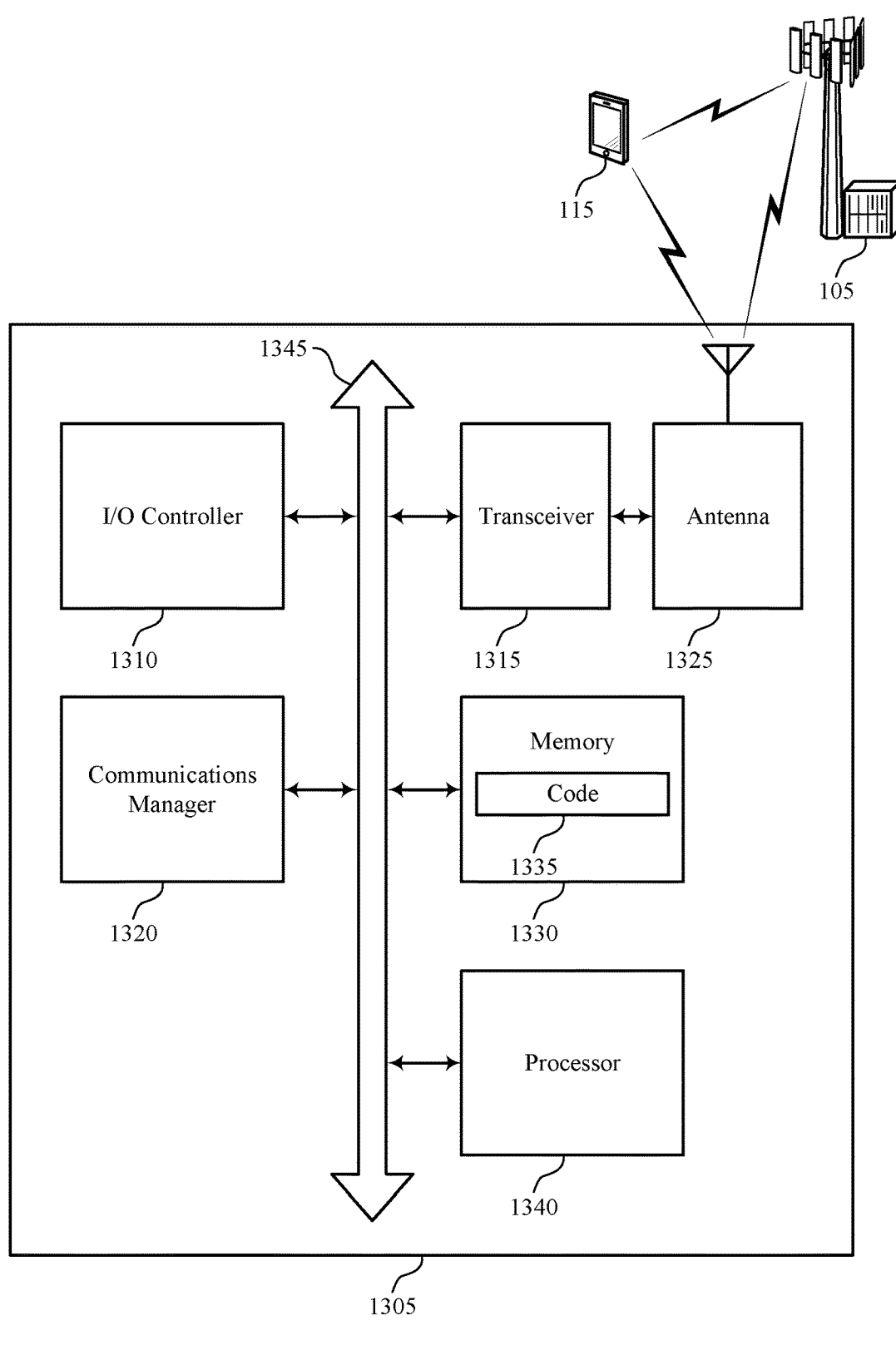
FIG. 13 illustrates a diagram of a system including a device that supports OCC for multiplexing transmissions by multiple UEs in accordance with one or more aspects of the present disclosure.

FIG. 13 illustrates a diagram of a system 1300 including a device 1305 that supports OCC for multiplexing transmissions by multiple UEs 115 in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting OCC for multiplexing transmissions by multiple UEs). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving, from a network entity, control signaling indicating a multiplexing order, a repetition configuration, and an orthogonal cover coding configuration to apply to an uplink grant, where the repetition configuration indicates a set of RVs, a first quantity of REs associated with each repetition of each RV of the set of RVs, and a quantity of repetitions associated with each RV of the set of RVs, and where the orthogonal cover coding configuration is based on the multiplexing order. The communications manager 1320 may be configured as or otherwise support a means for generating a transport block including one or more instances of the set of RVs, the one or more instances of the set of RVs mapped to a set of REs of the transport block across time based on the multiplexing order and the orthogonal cover coding configuration. The communications manager 1320 may be configured as or otherwise support a means for transmitting, to the network entity, an uplink transmission including the transport block in accordance with the uplink grant.

By including or configuring the communications manager 1320 in accordance with examples as described herein, the device 1305 may support techniques for increasing uplink capacity while reducing interference from simultaneous transmissions from UEs 115. In particular, by applying the orthogonal cover coding configuration, the uplink capacity at the network entity 105 may increase. The quantity of UEs 115 using the same time and frequency resources for the uplink transmissions increases with respect to uplink transmissions without the orthogonal cover coding configuration. Moreover, data from the different UEs 115 may be efficiently decoded to identify respective UEs 1150 that are simultaneously transmitting.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of OCC for multiplexing transmissions by multiple UEs as described herein, or the processor 1340 and the memory 1330 may be otherwise configured to perform or support such operations.

Figure 14:
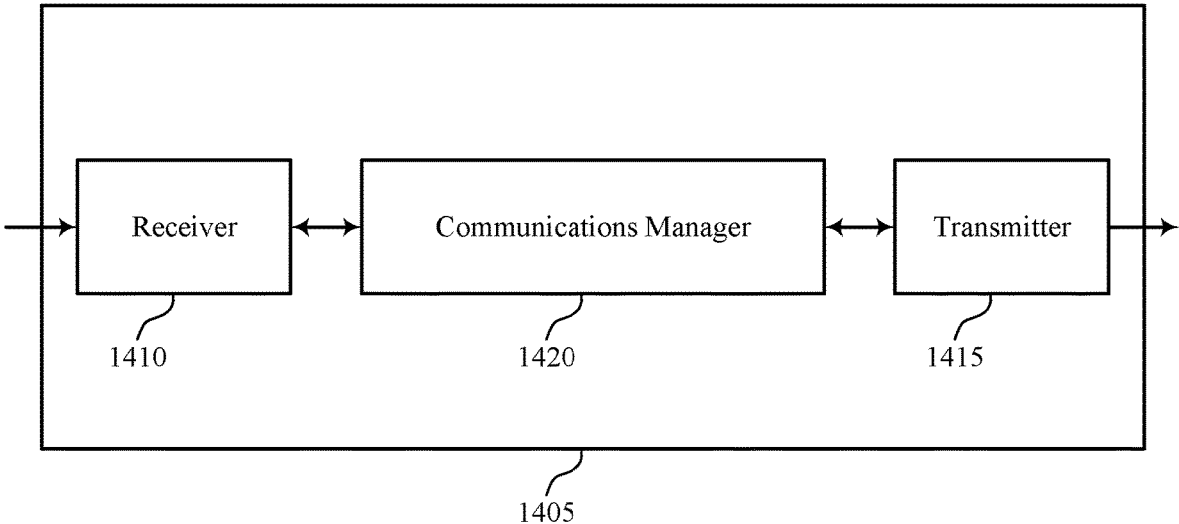
FIGS. 14 and 15 illustrate block diagrams of devices that support OCC for multiplexing transmissions by multiple UEs in accordance with one or more aspects of the present disclosure.

FIG. 14 illustrates a block diagram 1400 of a device 1405 that supports OCC for multiplexing transmissions by multiple UEs 115 in accordance with one or more aspects of the present disclosure. The device 1405 may be an example of aspects of a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of OCC for multiplexing transmissions by multiple UEs as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a network entity in accordance with examples as disclosed herein. For example, the communications manager 1420 may be configured as or otherwise support a means for transmitting, to a set of UEs, control signaling indicating a multiplexing order, a repetition configuration, and respective orthogonal cover coding configurations to apply to respective uplink grants for the set of UEs, where the repetition configuration indicates a set of RVs, a first quantity of REs associated with each repetition of each RV of the set of RVs, and a quantity of repetitions associated with each RV of the set of RVs, and where the respective orthogonal cover coding configurations are based on the multiplexing order. The communications manager 1420 may be configured as or otherwise support a means for receiving, from the set of UEs, a set of multiplexed uplink transmissions including respective transport blocks encoded using the respective orthogonal cover coding configurations, where the respective transport blocks include respective one or more instances of respective sets of RVs, the respective one or more instances of the respective sets of RVs mapped to a set of REs associated with the respective uplink grants based on the multiplexing order and the respective orthogonal cover coding configurations. The communications manager 1420 may be configured as or otherwise support a means for decoding the respective transport blocks based on the respective orthogonal cover coding configurations associated with the set of UEs.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for increasing uplink capacity while reducing interference from simultaneous transmissions from UEs 115. In particular, by applying the orthogonal cover coding configuration, the uplink capacity at the network entity 105 may increase. The quantity of UEs 115 using the same time and frequency resources for the uplink transmissions increases with respect to uplink transmissions without the orthogonal cover coding configuration. Moreover, data from the different UEs 115 may be efficiently decoded to identify respective UEs 115 that are simultaneously transmitting.

Figure 15:
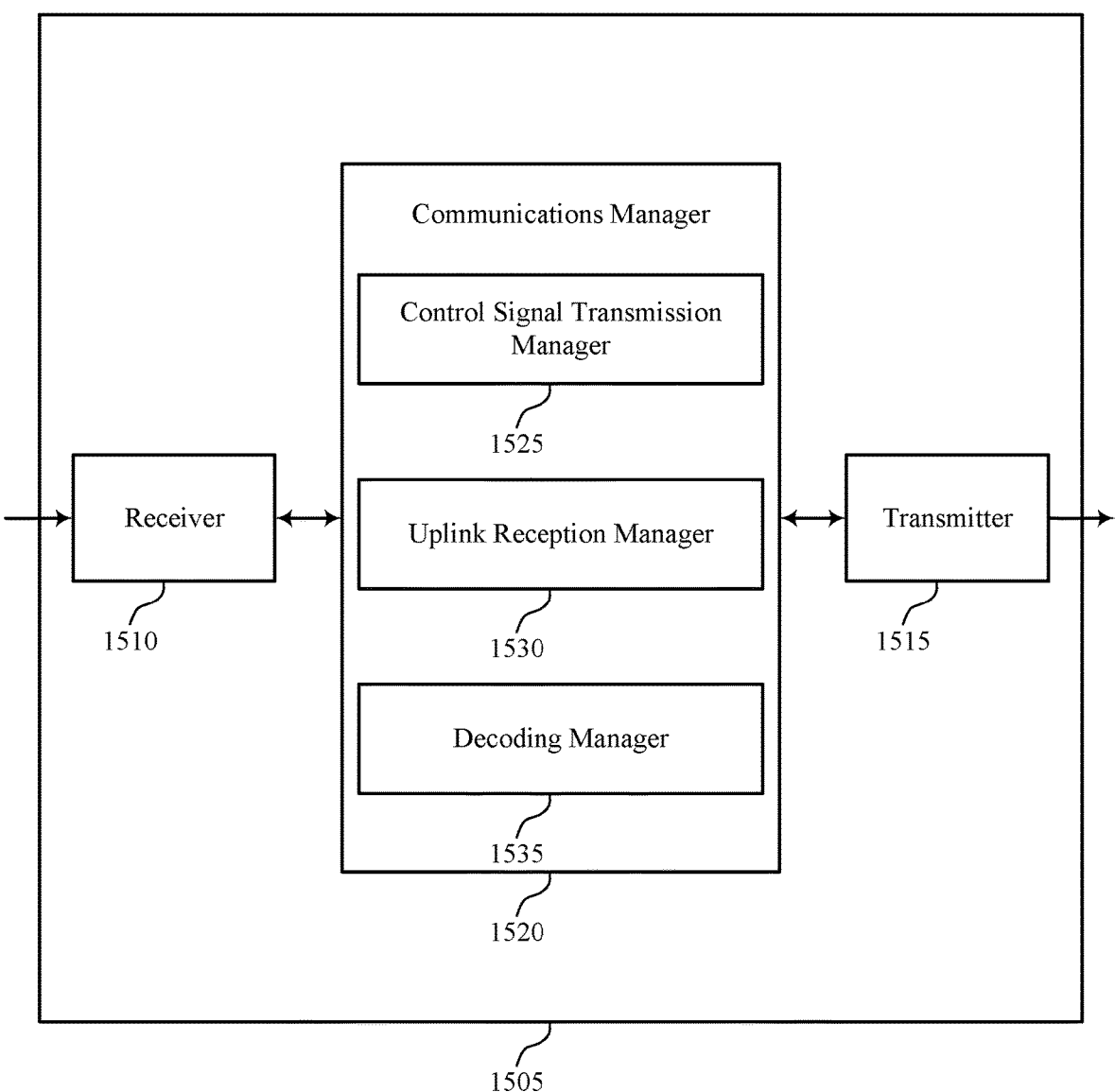

FIG. 15 illustrates a block diagram 1500 of a device 1505 that supports OCC for multiplexing transmissions by multiple UEs 115 in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of OCC for multiplexing transmissions by multiple UEs as described herein. For example, the communications manager 1520 may include a control signal transmission manager 1525, an uplink reception manager 1530, a decoding manager 1535, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at a network entity in accordance with examples as disclosed herein. The control signal transmission manager 1525 may be configured as or otherwise support a means for transmitting, to a set of UEs, control signaling indicating a multiplexing order, a repetition configuration, and respective orthogonal cover coding configurations to apply to respective uplink grants for the set of UEs, where the repetition configuration indicates a set of RVs, a first quantity of REs associated with each repetition of each RV of the set of RVs, and a quantity of repetitions associated with each RV of the set of RVs, and where the respective orthogonal cover coding configurations are based on the multiplexing order. The uplink reception manager 1530 may be configured as or otherwise support a means for receiving, from the set of UEs, a set of multiplexed uplink transmissions including respective transport blocks encoded using the respective orthogonal cover coding configurations, where the respective transport blocks include respective one or more instances of respective sets of RVs, the respective one or more instances of the respective sets of RVs mapped to a set of REs associated with the respective uplink grants based on the multiplexing order and the respective orthogonal cover coding configurations. The decoding manager 1535 may be configured as or otherwise support a means for decoding the respective transport blocks based on the respective orthogonal cover coding configurations associated with the set of UEs.

Figure 16:
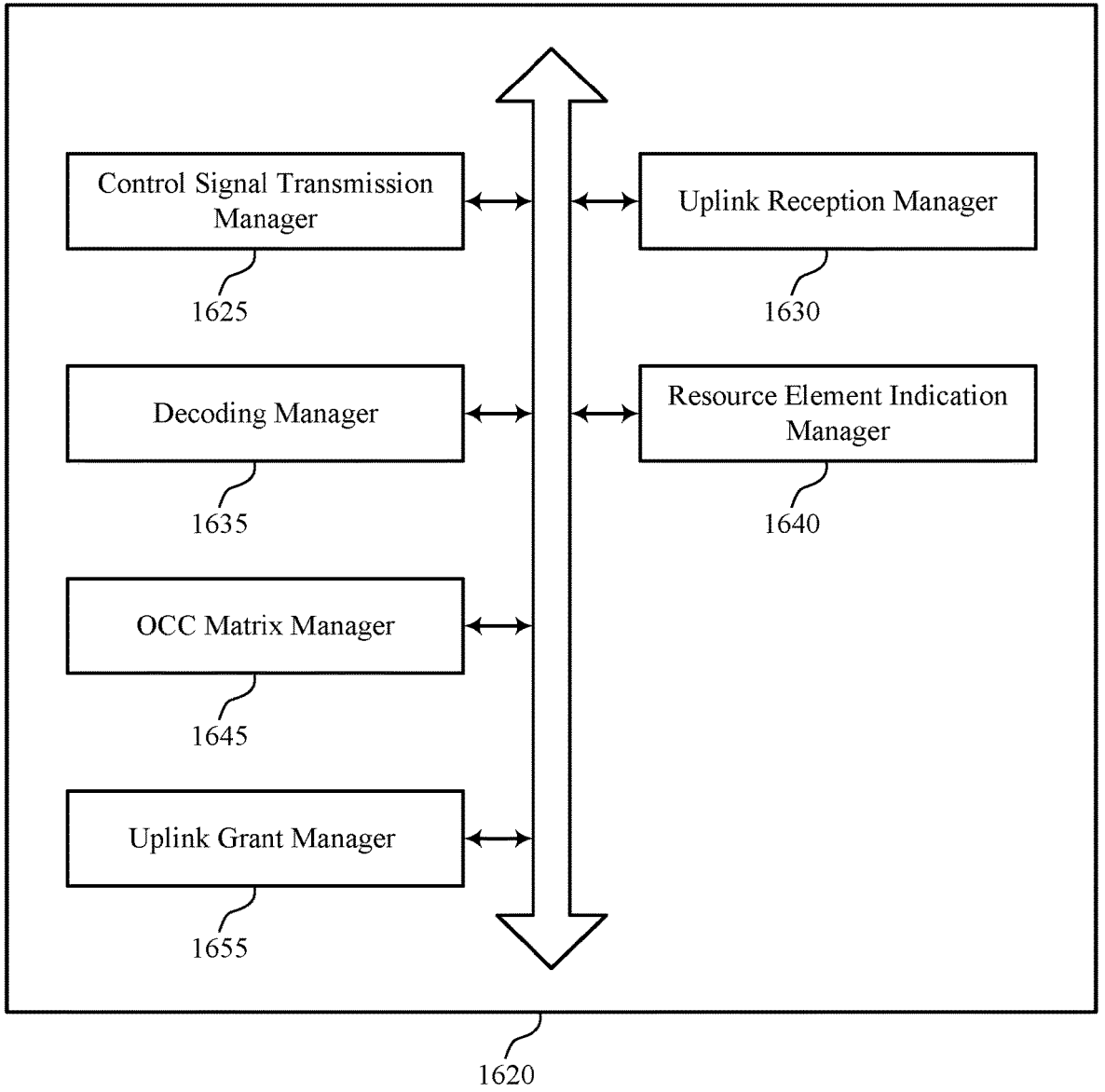
FIG. 16 illustrates a block diagram of a communications manager that supports OCC for multiplexing transmissions by multiple UEs in accordance with one or more aspects of the present disclosure.

FIG. 16 illustrates a block diagram 1600 of a communications manager 1620 that supports OCC for multiplexing transmissions by multiple UEs 115 in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of OCC for multiplexing transmissions by multiple UEs as described herein. For example, the communications manager 1620 may include a control signal transmission manager 1625, an uplink reception manager 1630, a decoding manager 1635, a RE indication manager 1640, a OCC matrix manager 1645, an uplink grant manager 1655, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communications at a network entity in accordance with examples as disclosed herein. The control signal transmission manager 1625 may be configured as or otherwise support a means for transmitting, to a set of UEs, control signaling indicating a multiplexing order, a repetition configuration, and respective orthogonal cover coding configurations to apply to respective uplink grants for the set of UEs, where the repetition configuration indicates a set of RVs, a first quantity of REs associated with each repetition of each RV of the set of RVs, and a quantity of repetitions associated with each RV of the set of RVs, and where the respective orthogonal cover coding configurations are based on the multiplexing order. The uplink reception manager 1630 may be configured as or otherwise support a means for receiving, from the set of UEs, a set of multiplexed uplink transmissions including respective transport blocks encoded using the respective orthogonal cover coding configurations, where the respective transport blocks include respective one or more instances of respective sets of RVs, the respective one or more instances of the respective sets of RVs mapped to a set of REs associated with the respective uplink grants based on the multiplexing order and the respective orthogonal cover coding configurations. The decoding manager 1635 may be configured as or otherwise support a means for decoding the respective transport blocks based on the respective orthogonal cover coding configurations associated with the set of UEs.

In some examples, the RE indication manager 1640 may be configured as or otherwise support a means for transmitting, to the set of UEs, an indication of the set of REs associated with the respective uplink grants, where the set of multiplexed uplink transmissions are received via the set of REs.

In some examples, the uplink grant manager 1655 may be configured as or otherwise support a means for transmitting, to a UE of the set of UEs, a second uplink grant associated with a second set of REs, where the second set of REs includes a same quantity of REs as the set of REs, and where a second multiplexing order associated with the second uplink grant is one. In some examples, the uplink reception manager 1630 may be configured as or otherwise support a means for receiving, from the UE, a second uplink transmission including a second transport block in accordance with the second uplink grant, where a first data capacity of the respective transport block associated with the UE is equal to a second data capacity of the second transport block.

In some examples, to support decoding the respective transport blocks based on the respective orthogonal cover coding configurations associated with the set of UEs, the decoding manager 1635 may be configured as or otherwise support a means for decoding the respective transport blocks based on the respective orthogonal cover coding configurations on a per symbol basis, a per slot basis, a per resource unit basis, or a per RV basis.

In some examples, to support transmitting the control signaling, the OCC matrix manager 1645 may be configured as or otherwise support a means for transmitting the control signaling indicating the respective orthogonal cover coding configurations include rows or columns associated with a Hadamard matrix or a discrete Fourier transform matrix, and where the control signaling indicates which rows or columns of the Hadamard matrix or the discrete Fourier transform matrix are associated with each of the set of UEs.

In some examples, a size of the Hadamard matrix or the discrete Fourier transform matrix is associated with the multiplexing order.

In some examples, to support transmitting the control signaling, the control signal transmission manager 1625 may be configured as or otherwise support a means for transmitting a first control message indicating the repetition configuration. In some examples, to support transmitting the control signaling, the control signal transmission manager 1625 may be configured as or otherwise support a means for transmitting respective second control messages to the set of UEs indicating the respective uplink grants, the multiplexing order, and the respective orthogonal cover coding configurations.

In some examples, a total quantity of repetitions is at least twice the multiplexing order, and the total quantity of repetitions is the quantity of repetitions associated with each RV multiplied by a quantity of RVs in the set of RVs.

In some examples, the network entity is a non-terrestrial network entity.

In some examples, to support transmitting the control signaling, the control signal transmission manager 1625 may be configured as or otherwise support a means for transmitting the control signaling via RRC signaling, a medium access control MAC-CE, or a combination thereof.

Figure 17:
FIG. 17 illustrates a diagram of a system including a device that supports OCC for multiplexing transmissions by multiple UEs in accordance with one or more aspects of the present disclosure.

FIG. 17 illustrates a diagram of a system 1700 including a device 1705 that supports OCC for multiplexing transmissions by multiple UEs 115 in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, a memory 1725, code 1730, and a processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. In some implementations, the transceiver 1710 may include one or more interfaces, such as one or more interfaces coupled with the one or more antennas 1715 that are configured to support various receiving or obtaining operations, or one or more interfaces coupled with the one or more antennas 1715 that are configured to support various transmitting or outputting operations, or a combination thereof. In some implementations, the transceiver 1710 may include or be configured for coupling with one or more processors or memory components that are operable to perform or support operations based on received or obtained information or signals, or to generate information or other signals for transmission or other outputting, or any combination thereof. In some implementations, the transceiver 1710, or the transceiver 1710 and the one or more antennas 1715, or the transceiver 1710 and the one or more antennas 1715 and one or more processors or memory components (for example, the processor 1735, or the memory 1725, or both), may be included in a chip or chip assembly that is installed in the device 1705. In some examples, the transceiver may be operable to support communications via one or more communications links (e.g., a communication link 125, a backhaul communication link 120, a midhaul communication link 162, a fronthaul communication link 168).

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting OCC for multiplexing transmissions by multiple UEs). For example, the device 1705 or a component of the device 1705 may include a processor 1735 and memory 1725 coupled with the processor 1735, the processor 1735 and memory 1725 configured to perform various functions described herein. The processor 1735 may be an example of a cloud-computing platform (e.g., one or more physical nodes and supporting software such as operating systems, virtual machines, or container instances) that may host the functions (e.g., by executing code 1730) to perform the functions of the device 1705. The processor 1735 may be any one or more suitable processors capable of executing scripts or instructions of one or more software programs stored in the device 1705 (such as within the memory 1725). In some implementations, the processor 1735 may be a component of a processing system. A processing system may generally refer to a system or series of machines or components that receives inputs and processes the inputs to produce a set of outputs (which may be passed to other systems or components of, for example, the device 1705). For example, a processing system of the device 1705 may refer to a system including the various other components or subcomponents of the device 1705, such as the processor 1735, or the transceiver 1710, or the communications manager 1720, or other components or combinations of components of the device 1705. The processing system of the device 1705 may interface with other components of the device 1705, and may process information received from other components (such as inputs or signals) or output information to other components. For example, a chip or modem of the device 1705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1705 may transmit information output from the chip or modem. Additionally, or alternatively, in some implementations, the one or more interfaces may refer to an interface between the processing system of the chip or modem and a receiver, such that the device 1705 may obtain information or signal inputs, and the information may be passed to the processing system. A person having ordinary skill in the art will readily recognize that a first interface also may obtain information or signal inputs, and a second interface also may output information or signal outputs.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the memory 1725, the code 1730, and the processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with UEs 115 in cooperation with other network entities 105. In some examples, the communications manager 1720 may support an X2 interface within an LTE/LTE-A wireless communications network technology to provide communication between network entities 105.

The communications manager 1720 may support wireless communications at a network entity in accordance with examples as disclosed herein. For example, the communications manager 1720 may be configured as or otherwise support a means for transmitting, to a set of UEs, control signaling indicating a multiplexing order, a repetition configuration, and respective orthogonal cover coding configurations to apply to respective uplink grants for the set of UEs, where the repetition configuration indicates a set of RVs, a first quantity of REs associated with each repetition of each RV of the set of RVs, and a quantity of repetitions associated with each RV of the set of RVs, and where the respective orthogonal cover coding configurations are based on the multiplexing order. The communications manager 1720 may be configured as or otherwise support a means for receiving, from the set of UEs, a set of multiplexed uplink transmissions including respective transport blocks encoded using the respective orthogonal cover coding configurations, where the respective transport blocks include respective one or more instances of respective sets of RVs, the respective one or more instances of the respective sets of RVs mapped to a set of REs associated with the respective uplink grants based on the multiplexing order and the respective orthogonal cover coding configurations. The communications manager 1720 may be configured as or otherwise support a means for decoding the respective transport blocks based on the respective orthogonal cover coding configurations associated with the set of UEs.

By including or configuring the communications manager 1720 in accordance with examples as described herein, the device 1705 may support techniques for increasing uplink capacity while reducing interference from simultaneous transmissions from UEs 115. In particular, by applying the orthogonal cover coding configuration, the uplink capacity at the network entity 105 may increase. The quantity of UEs 115 using the same time and frequency resources for the uplink transmissions increases with respect to uplink transmissions without the orthogonal cover coding configuration. Moreover, data from the different UEs 115 may be efficiently decoded to identify respective UEs 1150 that are simultaneously transmitting.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the transceiver 1710, the processor 1735, the memory 1725, the code 1730, or any combination thereof. For example, the code 1730 may include instructions executable by the processor 1735 to cause the device 1705 to perform various aspects of OCC for multiplexing transmissions by multiple UEs as described herein, or the processor 1735 and the memory 1725 may be otherwise configured to perform or support such operations.

FIG. 18 illustrates a flowchart illustrating a method 1800 that supports OCC for multiplexing transmissions by multiple UEs 115 in accordance with one or more aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include receiving, from a network entity, control signaling indicating a multiplexing order, a repetition configuration, and an orthogonal cover coding configuration to apply to an uplink grant, where the repetition configuration indicates a set of RVs, a first quantity of REs associated with each repetition of each RV of the set of RVs, and a quantity of repetitions associated with each RV of the set of RVs, and where the orthogonal cover coding configuration is based on the multiplexing order. The operations of 1805 may be performed in accordance with examples as disclosed herein. In some examples, aspects of the operations of 1805 may be performed by a control signal reception manager 1225 as described with reference to FIG. 12.

At 1810, the method may include generating a transport block including one or more instances of the set of RVs, the one or more instances of the set of RVs mapped to a set of REs of the transport block across time based on the multiplexing order and the orthogonal cover coding configuration. In particular, the duration of a super RV (e.g., quantity of REs associated with each instance of the RV in the transport block) may be equal to the duration of an RV indicated in the repetition configuration (e.g., the quantity of REs in each RV in the repetition configuration) times the multiplexing order. The operations of 1810 may be performed in accordance with examples as disclosed herein. In some examples, aspects of the operations of 1810 may be performed by a transport block manager 1230 as described with reference to FIG. 12.

At 1815, the method may include transmitting, to the network entity, an uplink transmission including the transport block in accordance with the uplink grant. The operations of 1815 may be performed in accordance with examples as disclosed herein. In some examples, aspects of the operations of 1815 may be performed by an uplink transmission manager 1235 as described with reference to FIG. 12.

FIG. 19 illustrates a flowchart illustrating a method 1900 that supports OCC for multiplexing transmissions by multiple UEs 115 in accordance with one or more aspects of the present disclosure. The operations of the method 1900 may be implemented by a network entity or its components as described herein. For example, the operations of the method 1900 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to a set of UEs (UE)s, control signaling indicating a multiplexing order, a repetition configuration, and respective orthogonal cover coding configurations to apply to respective uplink grants for the set of UEs, where the repetition configuration indicates a set of RVs, a first quantity of REs associated with each repetition of each RV of the set of RVs, and a quantity of repetitions associated with each RV of the set of RVs, and where the respective orthogonal cover coding configurations are based on the multiplexing order. The operations of 1905 may be performed in accordance with examples as disclosed herein. In some examples, aspects of the operations of 1905 may be performed by a control signal transmission manager 1625 as described with reference to FIG. 16.

At 1910, the method may include receiving, from the set of UEs, a set of multiplexed uplink transmissions including respective transport blocks encoded using the respective orthogonal cover coding configurations, where the respective transport blocks include respective one or more instances of respective sets of RVs, the respective one or more instances of the respective sets of RVs mapped to a set of REs associated with the respective uplink grants based on the multiplexing order and the respective orthogonal cover coding configurations. The operations of 1910 may be performed in accordance with examples as disclosed herein. In some examples, aspects of the operations of 1910 may be performed by an uplink reception manager 1630 as described with reference to FIG. 16.

At 1915, the method may include decoding the respective transport blocks based on the respective orthogonal cover coding configurations associated with the set of UEs. The operations of 1915 may be performed in accordance with examples as disclosed herein. In some examples, aspects of the operations of 1915 may be performed by a decoding manager 1635 as described with reference to FIG. 16.

The following provides an overview of aspects of the present disclosure:

Aspect 1: A method for wireless communications at a UE, comprising: receiving, from a network entity, control signaling indicating a multiplexing order, a repetition configuration, and an orthogonal cover coding configuration to apply to an uplink grant, wherein the repetition configuration indicates a set of redundancy versions, a first quantity of resource elements associated with each repetition of each redundancy version of the set of redundancy versions, and a quantity of repetitions associated with each redundancy version of the set of redundancy versions, and wherein the orthogonal cover coding configuration is based at least in part on the multiplexing order; generating a transport block comprising one or more instances of the set of redundancy versions, the one or more instances of the set of redundancy versions mapped to a set of resource elements of the transport block across time based at least in part on the multiplexing order and the orthogonal cover coding configuration; and transmitting, to the network entity, an uplink transmission comprising the transport block in accordance with the uplink grant.

Aspect 2: The method of aspect 1, further comprising: receiving, from the network entity, an indication that the set of resource elements is associated with the uplink grant; and mapping each instance of each redundancy version of the set of redundancy versions to subsets of resource elements of the set of resource elements, a second quantity of resource elements of each subset being the first quantity multiplied by the multiplexing order.

Aspect 3: The method of aspect 2, further comprising: receiving, from the network entity, a second uplink grant associated with a second set of resource elements, wherein the second set of resource elements comprises a same quantity of resource elements as the set of resource elements, and wherein a second multiplexing order associated with the second uplink grant is one; generating a second transport block in accordance with the repetition configuration; and transmitting, to the network entity, a second uplink transmission comprising the second transport block in accordance with the second uplink grant, wherein a first data capacity of the transport block is equal to a second data capacity of the second transport block.

Aspect 4: The method of any of aspects 1 through 3, wherein generating the transport block comprises: generating the set of redundancy versions from a data buffer; mapping sets of repetitions of the set of redundancy versions to respective consecutive subsets of resource elements of the set of resource elements across time, wherein a quantity of repetitions of each of the sets of repetitions is based at least in part on the multiplexing order; and applying the orthogonal cover coding configuration to the sets of repetitions of the set of redundancy versions mapped to the respective consecutive subsets of resource elements across time to generate the transport block.

Aspect 5: The method of aspect 4, wherein applying the orthogonal cover coding configuration comprises: applying the orthogonal cover coding configuration on a per symbol basis, a per slot basis, a per resource unit basis, or a per redundancy version basis.

Aspect 6: The method of any of aspects 1 through 5, wherein receiving the control signaling comprises: receiving the control signaling indicating the orthogonal cover coding configuration comprises rows or columns associated with a Hadamard matrix or a discrete Fourier transform matrix, and wherein the control signaling indicates which rows or columns of the Hadamard matrix or the discrete Fourier transform matrix are associated with the UE.

Aspect 7: The method of aspect 6, wherein a size of the Hadamard matrix or the discrete Fourier transform matrix is associated with the multiplexing order.

Aspect 8: The method of any of aspects 1 through 7, wherein receiving the control signaling comprises: receiving a first control message indicating the repetition configuration; and receiving a second control message indicating the uplink grant, the multiplexing order, and the orthogonal cover coding configuration.

Aspect 9: The method of any of aspects 1 through 8, wherein a total quantity of repetitions is at least twice the multiplexing order, and the total quantity of repetitions is the quantity of repetitions associated with each redundancy version multiplied by a quantity of redundancy versions in the set of redundancy versions Aspect 10: The method of any of aspects 1 through 9, wherein the network entity is a non-terrestrial network entity.

Aspect 11: The method of any of aspects 1 through 10, wherein receiving the control signaling comprises: receiving the control signaling via radio resource control signaling, a medium access control (MAC) control element, or a combination thereof.

Aspect 12: A method for wireless communications at a network entity, comprising: transmitting, to a set of user equipments (UE)s, control signaling indicating a multiplexing order, a repetition configuration, and respective orthogonal cover coding configurations to apply to respective uplink grants for the set of UEs, wherein the repetition configuration indicates a set of redundancy versions, a first quantity of resource elements associated with each repetition of each redundancy version of the set of redundancy versions, and a quantity of repetitions associated with each redundancy version of the set of redundancy versions, and wherein the respective orthogonal cover coding configurations are based at least in part on the multiplexing order; receiving, from the set of UEs, a set of multiplexed uplink transmissions comprising respective transport blocks encoded using the respective orthogonal cover coding configurations, wherein the respective transport blocks comprise respective one or more instances of respective sets of redundancy versions, the respective one or more instances of the respective sets of redundancy versions mapped to a set of resource elements associated with the respective uplink grants based at least in part on the multiplexing order and the respective orthogonal cover coding configurations; and decoding the respective transport blocks based at least in part on the respective orthogonal cover coding configurations associated with the set of UEs.

Aspect 13: The method of aspect 12, further comprising: transmitting, to the set of UEs, an indication of the set of resource elements associated with the respective uplink grants, wherein the set of multiplexed uplink transmissions are received via the set of resource elements.

Aspect 14: The method of aspect 13, further comprising: transmitting, to a UE of the set of UEs, a second uplink grant associated with a second set of resource elements, wherein the second set of resource elements comprises a same quantity of resource elements as the set of resource elements, and wherein a second multiplexing order associated with the second uplink grant is one; receiving, from the UE, a second uplink transmission comprising a second transport block in accordance with the second uplink grant, wherein a first data capacity of the respective transport block associated with the UE is equal to a second data capacity of the second transport block.

Aspect 15: The method of any of aspects 12 through 14, wherein decoding the respective transport blocks based at least in part on the respective orthogonal cover coding configurations associated with the set of UEs comprises: decoding the respective transport blocks based at least in part on the respective orthogonal cover coding configurations on a per symbol basis, a per slot basis, a per resource unit basis, or a per redundancy version basis.

Aspect 16: The method of any of aspects 12 through 15, wherein transmitting the control signaling comprises: transmitting the control signaling indicating the respective orthogonal cover coding configurations comprise rows or columns associated with a Hadamard matrix or a discrete Fourier transform matrix, and wherein the control signaling indicates which rows or columns of the Hadamard matrix or the discrete Fourier transform matrix are associated with each of the set of UEs.

Aspect 17: The method of aspect 16, wherein a size of the Hadamard matrix or the discrete Fourier transform matrix is associated with the multiplexing order.

Aspect 18: The method of any of aspects 12 through 17, wherein transmitting the control signaling comprises: transmitting a first control message indicating the repetition configuration; and transmitting respective second control messages to the set of UEs indicating the respective uplink grants, the multiplexing order, and the respective orthogonal cover coding configurations.

Aspect 19: The method of any of aspects 12 through 18, wherein a total quantity of repetitions is at least twice the multiplexing order, and the total quantity of repetitions is the quantity of repetitions associated with each redundancy version multiplied by a quantity of redundancy versions in the set of redundancy versions.

Aspect 20: The method of any of aspects 12 through 19, wherein the network entity is a non-terrestrial network entity.

Aspect 21: The method of any of aspects 12 through 20, wherein transmitting the control signaling comprises: transmitting the control signaling via radio resource control signaling, a medium access control (MAC) control element, or a combination thereof.

Aspect 22: An apparatus for wireless communications at a UE, comprising a processor; memory coupled with the processor; and instructions stored in the memory and executable by the processor to cause the apparatus to perform a method of any of aspects 1 through 11.

Aspect 23: An apparatus for wireless communications at a UE, comprising at least one means for performing a method of any of aspects 1 through 11.

Aspect 24: A non-transitory computer-readable medium storing code for wireless communications at a UE, the code comprising instructions executable by a processor to perform a method of any of aspects 1 through 11.

Aspect 25: An apparatus for wireless communications at a network entity, comprising a processor; memory coupled with the processor; and instructions stored in the memory and executable by the processor to cause the apparatus to perform a method of any of aspects 12 through 21.

Aspect 26: An apparatus for wireless communications at a network entity, comprising at least one means for performing a method of any of aspects 12 through 21.

Aspect 27: A non-transitory computer-readable medium storing code for wireless communications at a network entity, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a network entity, control signaling indicating a multiplexing order, a repetition configuration, and an orthogonal cover coding configuration to apply to an uplink grant, wherein the repetition configuration indicates a set of redundancy versions, a first quantity of resource elements associated with each repetition of each redundancy version of the set of redundancy versions, and a quantity of repetitions associated with each redundancy version of the set of redundancy versions, and wherein the orthogonal cover coding configuration is based at least in part on the multiplexing order;

generating a transport block comprising one or more instances of the set of redundancy versions, the one or more instances of the set of redundancy versions mapped to a set of resource elements of the transport block across time based at least in part on the multiplexing order and the orthogonal cover coding configuration; and transmitting, to the network entity, an uplink transmission comprising the transport block in accordance with the uplink grant.

2. The method of claim 1, further comprising:

receiving, from the network entity, an indication that the set of resource elements is associated with the uplink grant; and mapping each instance of each redundancy version of the set of redundancy versions to subsets of resource elements of the set of resource elements, a second quantity of resource elements of each subset being the first quantity multiplied by the multiplexing order.

3. The method of claim 2, further comprising:

receiving, from the network entity, a second uplink grant associated with a second set of resource elements, wherein the second set of resource elements comprises a same quantity of resource elements as the set of resource elements, and wherein a second multiplexing order associated with the second uplink grant is one;

generating a second transport block in accordance with the repetition configuration; and transmitting, to the network entity, a second uplink transmission comprising the second transport block in accordance with the second uplink grant, wherein a first data capacity of the transport block is equal to a second data capacity of the second transport block.

4. The method of claim 1, wherein generating the transport block comprises:

generating the set of redundancy versions from a data buffer;

mapping sets of repetitions of the set of redundancy versions to respective consecutive subsets of resource elements of the set of resource elements across time, wherein a quantity of repetitions of each of the sets of repetitions is based at least in part on the multiplexing order; and applying the orthogonal cover coding configuration to the sets of repetitions of the set of redundancy versions mapped to the respective consecutive subsets of resource elements across time to generate the transport block.

5. The method of claim 4, wherein applying the orthogonal cover coding configuration comprises:

applying the orthogonal cover coding configuration on a per symbol basis, a per slot basis, a per resource unit basis, or a per redundancy version basis.

6. The method of claim 1, wherein receiving the control signaling comprises:

receiving the control signaling indicating the orthogonal cover coding configuration comprises rows or columns associated with a Hadamard matrix or a discrete Fourier transform matrix, and wherein the control signaling indicates which rows or columns of the Hadamard matrix or the discrete Fourier transform matrix are associated with the UE.

7. The method of claim 6, wherein a size of the Hadamard matrix or the discrete Fourier transform matrix is associated with the multiplexing order.

8. The method of claim 1, wherein receiving the control signaling comprises:

receiving a first control message indicating the repetition configuration; and receiving a second control message indicating the uplink grant, the multiplexing order, and the orthogonal cover coding configuration.

9. The method of claim 1, wherein:

a total quantity of repetitions is at least twice the multiplexing order, and the total quantity of repetitions is the quantity of repetitions associated with each redundancy version multiplied by a quantity of redundancy versions in the set of redundancy versions.

10. The method of claim 1, wherein the network entity is a non-terrestrial network entity.

11. The method of claim 1, wherein receiving the control signaling comprises:

receiving the control signaling via radio resource control signaling, a medium access control (MAC) control element, or a combination thereof.

12. A method for wireless communications at a network entity, comprising:

transmitting, to a set of user equipments (UE) s, control signaling indicating a multiplexing order, a repetition configuration, and respective orthogonal cover coding configurations to apply to respective uplink grants for the set of UEs, wherein the repetition configuration indicates a set of redundancy versions, a first quantity of resource elements associated with each repetition of each redundancy version of the set of redundancy versions, and a quantity of repetitions associated with each redundancy version of the set of redundancy versions, and wherein the respective orthogonal cover coding configurations are based at least in part on the multiplexing order;

receiving, from the set of UEs, a set of multiplexed uplink transmissions comprising respective transport blocks encoded using the respective orthogonal cover coding configurations, wherein the respective transport blocks comprise respective one or more instances of respective sets of redundancy versions, the respective one or more instances of the respective sets of redundancy versions mapped to a set of resource elements associated with the respective uplink grants based at least in part on the multiplexing order and the respective orthogonal cover coding configurations; and decoding the respective transport blocks based at least in part on the respective orthogonal cover coding configurations associated with the set of UEs.

13. The method of claim 12, further comprising:

transmitting, to the set of UEs, an indication of the set of resource elements associated with the respective uplink grants, wherein the set of multiplexed uplink transmissions are received via the set of resource elements.

14. The method of claim 13, further comprising:

transmitting, to a UE of the set of UEs, a second uplink grant associated with a second set of resource elements, wherein the second set of resource elements comprises a same quantity of resource elements as the set of resource elements, and wherein a second multiplexing order associated with the second uplink grant is one; and receiving, from the UE, a second uplink transmission comprising a second transport block in accordance with the second uplink grant, wherein a first data capacity of a respective transport block associated with the UE is equal to a second data capacity of the second transport block.

15. The method of claim 12, wherein decoding the respective transport blocks based at least in part on the respective orthogonal cover coding configurations associated with the set of UEs comprises:

decoding the respective transport blocks based at least in part on the respective orthogonal cover coding configurations on a per symbol basis, a per slot basis, a per resource unit basis, or a per redundancy version basis.

16. The method of claim 12, wherein transmitting the control signaling comprises:

transmitting the control signaling indicating the respective orthogonal cover coding configurations comprise rows or columns associated with a Hadamard matrix or a discrete Fourier transform matrix, and wherein the control signaling indicates which rows or columns of the Hadamard matrix or the discrete Fourier transform matrix are associated with each of the set of UEs.

17. The method of claim 16, wherein a size of the Hadamard matrix or the discrete Fourier transform matrix is associated with the multiplexing order.

18. The method of claim 12, wherein transmitting the control signaling comprises:

transmitting a first control message indicating the repetition configuration; and transmitting respective second control messages to the set of UEs indicating the respective uplink grants, the multiplexing order, and the respective orthogonal cover coding configurations.

19. The method of claim 12, wherein:

a total quantity of repetitions is at least twice the multiplexing order, and the total quantity of repetitions is the quantity of repetitions associated with each redundancy version multiplied by a quantity of redundancy versions in the set of redundancy versions.

20. The method of claim 12, wherein the network entity is a non-terrestrial network entity.

21. The method of claim 12, wherein transmitting the control signaling comprises:

transmitting the control signaling via radio resource control signaling, a medium access control (MAC) control element, or a combination thereof.

22. An apparatus for wireless communications at a user equipment (UE), comprising:

one or more processors;

one or more memories coupled with the one or more processors; and instructions stored in the one or more memories and executable by the one or more processors to cause the apparatus to:

receive, from a network entity, control signaling indicating a multiplexing order, a repetition configuration, and an orthogonal cover coding configuration to apply to an uplink grant, wherein the repetition configuration indicates a set of redundancy versions, a first quantity of resource elements associated with each repetition of each redundancy version of the set of redundancy versions, and a quantity of repetitions associated with each redundancy version of the set of redundancy versions, and wherein the orthogonal cover coding configuration is based at least in part on the multiplexing order;

generate a transport block comprising one or more instances of the set of redundancy versions, the one or more instances of the set of redundancy versions mapped to a set of resource elements of the transport block across time based at least in part on the multiplexing order and the orthogonal cover coding configuration; and transmit, to the network entity, an uplink transmission comprising the transport block in accordance with the uplink grant.

23. An apparatus for wireless communications at a network entity, comprising:

one or more processors;

one or more memories coupled with the one or more processors; and instructions stored in the one or more memories and executable by the one or more processors to cause the apparatus to:

transmit, to a set of user equipments (UE) s, control signaling indicating a multiplexing order, a repetition configuration, and respective orthogonal cover coding configurations to apply to respective uplink grants for the set of UEs, wherein the repetition configuration indicates a set of redundancy versions, a first quantity of resource elements associated with each repetition of each redundancy version of the set of redundancy versions, and a quantity of repetitions associated with each redundancy version of the set of redundancy versions, and wherein the respective orthogonal cover coding configurations are based at least in part on the multiplexing order;

receive, from the set of UEs, a set of multiplexed uplink transmissions comprising respective transport blocks encoded using the respective orthogonal cover coding configurations, wherein the respective transport blocks comprise respective one or more instances of respective sets of redundancy versions, the respective one or more instances of the respective sets of redundancy versions mapped to a set of resource elements associated with the respective uplink grants based at least in part on the multiplexing order and the respective orthogonal cover coding configurations; and decode the respective transport blocks based at least in part on the respective orthogonal cover coding configurations associated with the set of UEs.

* * * * *